United States Patent
Horn et al.

(10) Patent No.: US 8,995,469 B2
(45) Date of Patent: Mar. 31, 2015

(54) RELAY BASED HEADER COMPRESSION

(75) Inventors: Gavin B. Horn, La Jolla, CA (US); Parag A. Agashe, San Diego, CA (US); Peerapol Tinnakornsrisuphap, San Diego, CA (US); Xiaofei Wang, Somerville, MA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 12/360,531

(22) Filed: Jan. 27, 2009

(65) Prior Publication Data

US 2009/0238185 A1    Sep. 24, 2009

Related U.S. Application Data

(60) Provisional application No. 61/024,741, filed on Jan. 30, 2008.

(51) Int. Cl.
| | |
|---|---|
| *H04L 12/28* | (2006.01) |
| *H04J 3/16* | (2006.01) |
| *H04J 3/22* | (2006.01) |
| *G06F 15/16* | (2006.01) |
| *H04W 28/06* | (2009.01) |

(Continued)

(52) U.S. Cl.
CPC .............. *H04W 28/06* (2013.01); *H04W 40/02* (2013.01); *H04L 69/22* (2013.01)
USPC ........... 370/477; 370/328; 370/392; 370/465; 370/472; 709/246; 709/249

(58) Field of Classification Search
CPC   H04L 29/0604; H04L 29/0653; H04W 28/06
USPC ................. 370/329, 392, 328, 465, 472, 477; 709/246–247
See application file for complete search history.

(56) References Cited

U.S. PATENT DOCUMENTS

| | | | |
|---|---|---|---|
| 2003/0063607 A1 | 4/2003 | Adachi et al. | |
| 2003/0097464 A1* | 5/2003 | Martinez et al. | ............... 709/238 |

(Continued)

FOREIGN PATENT DOCUMENTS

| | | |
|---|---|---|
| CA | 2570923 A1 | 12/2005 |
| CN | 1311590 A | 9/2001 |

(Continued)

OTHER PUBLICATIONS

Degermark, M., Nordgren, B., and Pink, S. 1999 IP Header Compression.*

(Continued)

*Primary Examiner* — Ayaz Sheikh
*Assistant Examiner* — Tarell Hampton
(74) *Attorney, Agent, or Firm* — Paul Kuo

(57) ABSTRACT

Relays can be used to facilitate communication of a packet, such as from a base station to a mobile device. The packet can include a header that designates an intended destination for the packet. The header can transfer such that the intended destination designation can be sent with or without being decompressed at a relay. If there is more than one relay involved in communication, then the header can configure such that the header is accessible without performing decompression. However, if there is one relay stop, then the header can compress the designator in such a way that decompression should occur.

52 Claims, 19 Drawing Sheets

(51) Int. Cl.
*H04L 29/06* (2006.01)
*H04W 40/02* (2009.01)

(56) References Cited

U.S. PATENT DOCUMENTS

| | | | |
|---|---|---|---|
| 2004/0081203 A1* | 4/2004 | Sodder et al. | 370/469 |
| 2005/0030940 A1 | 2/2005 | Abrol et al. | |
| 2005/0086367 A1* | 4/2005 | Conta et al. | 709/238 |
| 2006/0227706 A1* | 10/2006 | Burst, Jr. | 370/229 |
| 2007/0002850 A1* | 1/2007 | Guichard et al. | 370/389 |
| 2007/0299971 A1 | 12/2007 | Mangetsu | |
| 2008/0013513 A1 | 1/2008 | Kurokawa | |
| 2008/0122938 A1* | 5/2008 | Broberg et al. | 348/222.1 |
| 2009/0016282 A1* | 1/2009 | Gasparroni et al. | 370/329 |

FOREIGN PATENT DOCUMENTS

| | | | |
|---|---|---|---|
| EP | 1804441 A1 | | 7/2007 |
| GB | 2448004 A | * | 10/2008 |
| JP | 2002077242 A | | 3/2002 |
| JP | 2002538672 A | | 11/2002 |
| JP | 2003298639 A | | 10/2003 |
| JP | 2007150825 A | | 6/2007 |
| JP | 2008283500 A | | 11/2008 |
| JP | 2009538581 | | 11/2009 |
| RU | 2310283 C2 | | 11/2007 |
| WO | WO9946899 A2 | | 9/1999 |
| WO | 0229991 A1 | | 4/2002 |
| WO | 2004017578 A1 | | 2/2004 |
| WO | WO2005122710 A2 | | 12/2005 |
| WO | WO2006008341 A1 | | 1/2006 |
| WO | WO2007053950 A1 | | 5/2007 |
| WO | 2007140255 | | 12/2007 |

OTHER PUBLICATIONS

3GPP TS 29.060, GPRS Tunneling Protocol (GTP) across the GN and Gp Interface.*
International Search Report & Written Opinion—PCT/US2009/032296—Itnernational Search Authority—European Patent Office—May 21, 2010.
Partial International Search—PCT/US2009/032296—International Search Authority—European Patent Offce, Apr. 7, 2010.
European Search Report—EP12179204—Search Authority—The Munich—Sep. 14, 2012.
Taiwan Search Report—TW098103144—TIPO—Mar. 1, 2012.

* cited by examiner

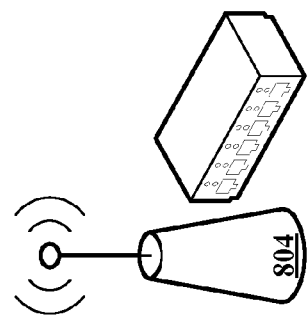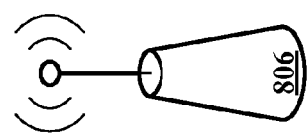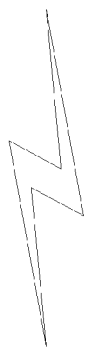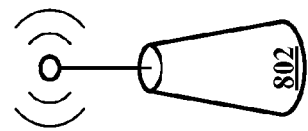
FIG. 8

RELAY BASED HEADER COMPRESSION

CROSS-REFERENCE

This application claims priority to U.S. application No. 61/024,741 entitled "Compression Protocol for a Mesh Network", which was filed on Jan. 30, 2008. The entirety of which is herein incorporated by reference.

BACKGROUND

1. Field

The following description relates generally to wireless communications and, more particularly, to determining a compression manner for a packet header based upon relay travel.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

A relay can be used in transmission of information between the base station and the mobile device. A base station can have a number of different relays that function to assist in information transmission. For instance, when the base station transmits information to the mobile device, a relay can be employed to keep integrity of the information such that there is not information loss through travelling over a relatively long distance.

In some configurations, more than one relay can be employed to assist in information transmission. A packet of information for transfer can incorporate a header that includes destination information. To save space, compression techniques can be used on the packet header, such that the destination information is compressed—to evaluate the destination information, the header is decompressed. Thus, at each relay stop, the header can be decompressed, evaluated, recompressed, and then transferred to another relay or destination. This can become a resource intensive process and relatively time consuming since decompression occurs at each relay stop.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, there can be a method for managing compression of a header of a packet executable upon a wireless communication device. The method can include identifying that header compression should occur for the packet as well as determining a manner of compression for the packet, wherein the manner is based upon a number of relay transfers for the packet to reach an intended destination.

With a further aspect, there can be an apparatus with an evaluation module that header compression should occur for the packet as well as with a selection module that determines a manner of compression for the packet, wherein the manner is based upon a number of relay transfers for the packet to reach an intended destination.

Another aspect can include at least one processor configured to managing compression of a header of a packet. The processor can incorporate a first module for identifying that header compression should occur for the packet. A second module can also be incorporated with the processor for determining a manner of compression for the packet, wherein the manner is based upon a number of relay transfers for the packet to reach an intended destination.

In yet a further aspect, there can be a computer program product, comprising a computer-readable medium. The medium can incorporate a first set of codes for causing a computer to identify that header compression should occur for the packet. A second set of codes can be incorporated for causing the computer to determine a manner of compression for the packet, wherein the manner is based upon a number of relay transfers for the packet to reach an intended destination.

With yet one more aspect, there can be an apparatus with means for identifying that header compression should occur for the packet. The apparatus can also be with means for determining a manner of compression for the packet, wherein the manner is based upon a number of relay transfers for the packet to reach an intended destination.

In one aspect, there can be a method for processing a packet executable upon a wireless communication device. The method can include evaluating a packet header portion that includes a destination identifier as well as determining an intended relay or intended destination for the packet based on at least a portion of the destination identifier.

With a further aspect, there can be an apparatus that uses an analysis module that evaluates a packet header portion that comprises a destination identifier. The apparatus can also use a location module that determines an intended relay or intended destination for the packet based on at least a portion of the destination identifier.

Another aspect can include at least on processor configured to process a packet with a first module for evaluating a packet header portion that includes a destination identifier. The processor can also process the packet with a second module for determining an intended relay intended relay or intended destination for the packet based on at least a portion of the destination identifier.

In yet a further aspect, there can be a computer program product that includes a computer-readable medium. The medium can include a first set of codes for causing a computer to evaluate a packet header portion that includes a destination identifier. Also, the medium can include a second set of codes for causing the computer to determining an intended relay or intended destination for the packet based on at least a portion of the destination identifier.

With yet one more aspect, there can be an apparatus with means for evaluating a packet header portion that includes a destination identifier as well as with means for determining an intended relay or intended destination for the packet based on at least a portion of the destination identifier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

FIG. 8 is an illustration of a representative communication configuration in accordance with at least one aspect disclosed herein.

DETAILED DESCRIPTION

Figure 1:
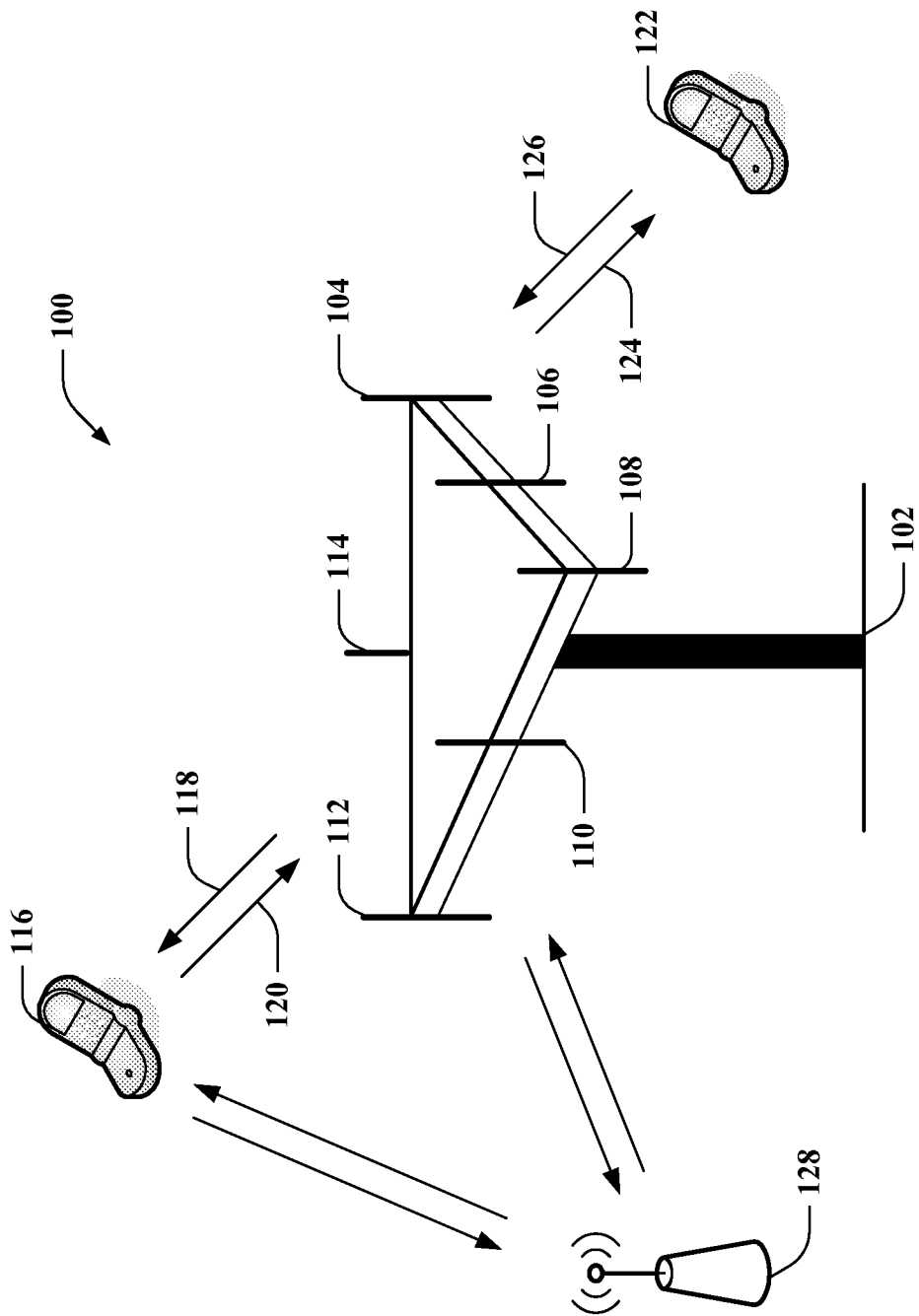
FIG. 1 is an illustration of a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more embodiments.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an"

as used in this application and the appended claims should generally be construed to mean "one or more" unless specified otherwise or clear from the context to be directed to a singular form.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDME, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

A relay 128 can be employed to transmit information from the access terminal 116 or 122 to the base station 102 and Vice Versa. A determination can be made if a relay should be employed and if so, then a packet header can be compressed between the relay 128 and the base station 102. On the uplink, the access terminal 116 or 122 can transmit the packet (with the header) to the relay 128—the relay can determine where to send the packet (e.g., to another relay, to the base station 102, etc.) and perform a transfer accordingly. On the downlink, the base station 102 can transmit the packet (with the header) to the relay 128—the relay can determine where to send the packet (e.g., to another relay, to the access terminal 116 or 122, etc.) and perform a transfer accordingly. In one implementation, once the relay forwards the packet, an acknowledgement can transfer to the base station 102 on the downlink and the access terminal 116 or 124 on the uplink on the status of the forwarding (e.g., to where the forwarding takes place, if there are any errors, and the like). While being depicted as used in access terminal to base station, it is to be appreciated that a relay can be used in access terminal to access terminal communication, as well as in other implementations. Relays can organize into a cluster, which can be a group of relays that service a base station.

Figure 2:
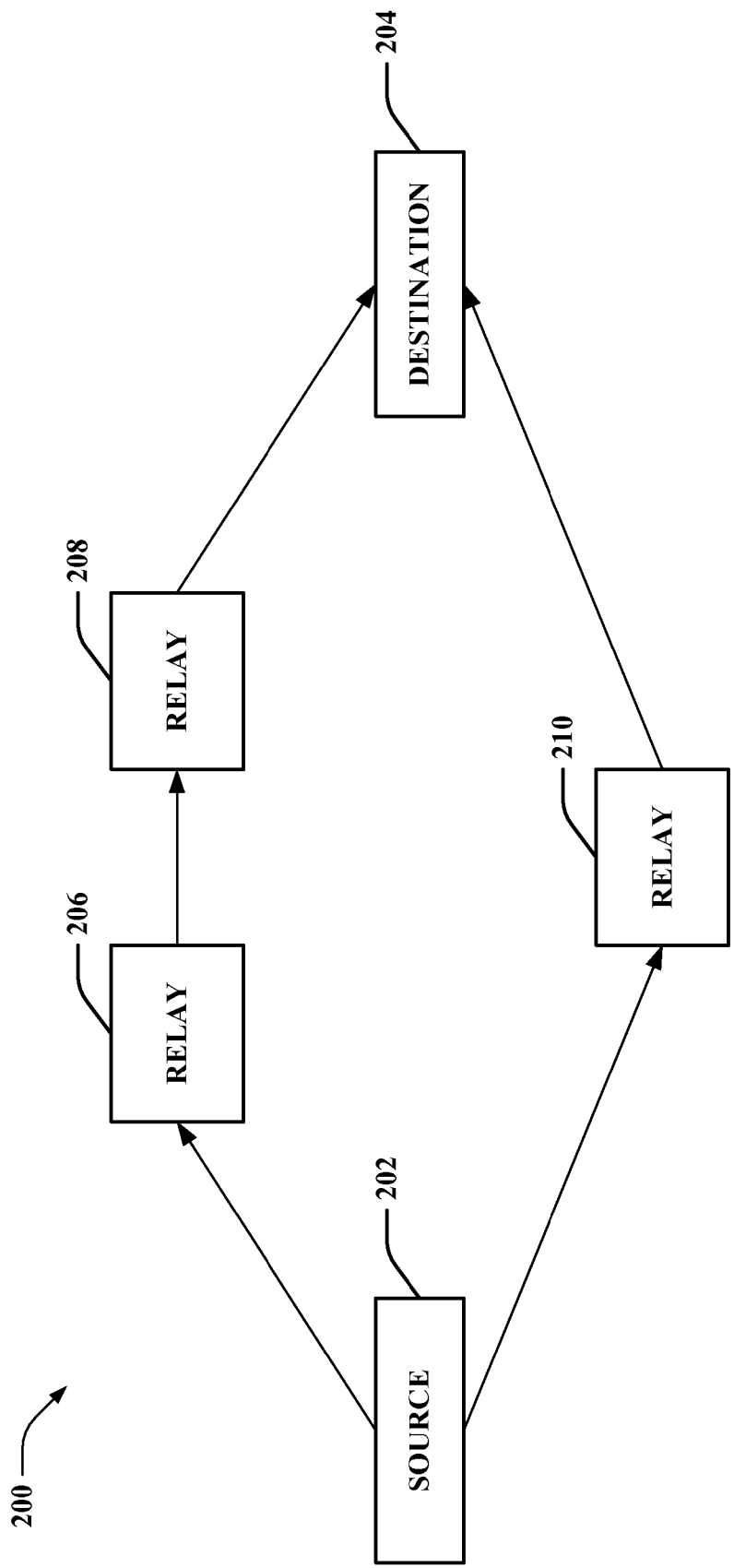
FIG. 2 is an illustration of a representative system with a relay cluster in accordance with at least one aspect disclosed herein.

Now referring to FIG. 2, an example system 200 is shown for a wireless communication network configuration. In such a network, information that transfers from one location to another can be assisted by relays. The information is emitted from a source 202 to a destination 204. A relay can appear as an access terminal to a base station (e.g., the link between the base station and the relay is managed in a same manner as a link is managed between the base station and an access terminal), and appear as a base station to terminals in which the relay communicates with (e.g., access terminal interprets the relay as just another base station which happens to have a wireless backhaul). Therefore, when the source 202 sends information, the information can actually travel to a relay 206 while the source 202 believes information is sent to the destination 204. This can facilitate the access terminal connecting with the relay as with a base station and the base station connecting with a relay as with an access terminal (e.g., a base station or access terminal can be unaware that communication is with a relay).

A source 202 (e.g., base station, mobile device, access terminal, etc.) can desire to send information to a destination 204 (e.g., base station, mobile device, access terminal, etc.). A number of relays, such as relays 206, 208, and 210, connect with one base station to function as a cluster—in one implementation, the cluster includes an associated base station. It is possible for a relay to belong to multiple clusters as well as for a relay to be exclusive to a cluster.

To reach a destination, a multi-hop transfer (e.g., source 202 to relay 206 then to relay 208, and finally to destination 204) can be employed. However, a single hop can take place such that there is only one transfer across travel (e.g., source 202 to relay 210 to destination 204). A communication network can be evaluated to determine how the information can reach the destination 204 from the source 202 and select a travel route with at least one relay. Depending on the outcome of a selection, single hop or multi-hop based compression of the information can occur.

Initially, a check can take place to determine if compression of the packet (e.g., of a header of the packet) should occur—this can be regardless of a number of hops for travel. If it is determined that compression should occur, then different compression can take place depending on if there is a multi-hop or single hop travel route. If there are multiple hops, then compression can occur such that destination information can be evaluated by a relay without performing decompression. It is desirable to minimize processing to enable perform quick forwarding at the relay. Since performing decompression and recompressing information takes a relatively long time, operation can be faster if these actions are not required to occur. Therefore, header compression can occur in such a manner that does not require decompression (e.g., the compressed header can be evaluated and an intended destination can be determined without decompression).

However, a final relay commonly decompresses a header in relation to transferring the packet to the destination (e.g., access terminal). If there is one relay, then decompression can automatically occur therefore there is no need to compress a header in a manner that allows data to be evaluated without decompression. Moreover, if there is only one hop that occurs, then the header can be compressed without routing information (e.g., since there are no further relay hops).

There can be a number of different functions that can be performed by a relay to assist operation of a communication network. For example, there can be support for forwarding access terminal packets—the packets can be passed along a backhaul and arrive at an appropriate access terminal. Thus, there can be support for forwarding of packets from a core network to an access terminal and from the access terminal to the core network. With another function, there can be control packets related to managing the access terminal by base stations and other relay stations (e.g., handover indications) that are processed.

There can be a further functionality that uses an Relay Protocol—the Relay Protocol can be split into two different protocols: a compression protocol (e.g., IOS (Interoperability Specification) Compression Protocol (ICP)) and a management protocol (e.g., Relay Management Protocol (RMP)). The ICP and RMP can be used at just below the transport layer to support relay operation. The compression protocol compresses packet headers on the backhaul (e.g., not payloads) while the management protocol handles routing operations in the backhaul for the packet. Thus, there can be independent hop-by-hop support in a relay cluster for the link layer air interface functions (e.g., security, fragmentation and reassembly of packets, etc.). The ICP can provide compression of UDP/IP (User Datagram Protocol/Internet Protocol) or L2TPv3/IP (Layer 2 Tunneling Protocol Version 3/Internet Protocol) headers of IOS packets.

Different interfaces can be used regarding operation of a relay. One interface can be used for sending signaling or session/paging information among network entities. Also, if an access terminal performs a handover from one base station to another, then an interface can be used to ensure that data packets that have not been delivered to the access terminal as well as access terminal state and control information is properly transmitted. If packet portions can be transmitted, (e.g. fragments of IP packets), then a specific interface can also be used to communicate those portions.

Figure 3:
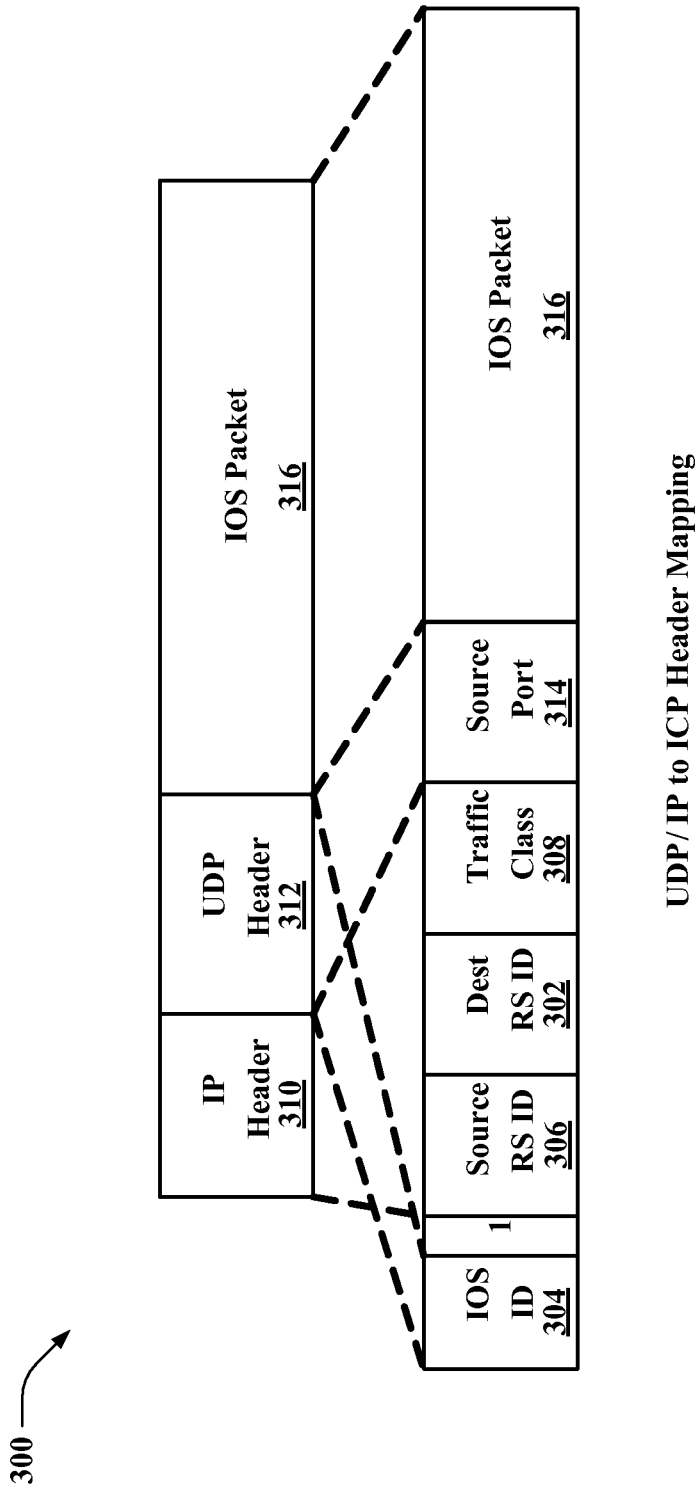
FIG. 3 is an illustration of a representative User Datagram Protocol/Internet Protocol compression scheme in accordance with at least one aspect disclosed herein.

Now referring to FIG. 3, an example packet configuration 300 is shown such that a packet is compressed so that there can be routing of a packet at each hop of a multi-hop configuration with a Destination (Dest) Relay (RS) Identification (ID) 302. An IOS identifier (IOS ID) 304 field indicates the interface and UDP destination port for that interface. For example, the interface that signals session and paging information can use a defined IOS ID, while the interface that manages the access terminal mobility can use a different IOS ID. The Source and Destination Relay (RS) Identification (ID), 306 and 302 respectively, identify the base station or relay station source and destination of the compressed header in the cluster respectively. These identifiers are equivalent for example to a source and destination IP address for routing. A Traffic Class 308 is for example the DSCP equivalent for QoS on the wireless backhaul and is used to indicate what prioritization, and service level the packet should receive. The header can be compressed while still easily presenting the Dest RS ID 302 and at each hop there can be an evaluation of the Dest RS ID 302. The Dest RS ID 302 can be uncompressed as well as compressed in a manner that still allows an intended destination to be determined without decompression. Thus, without performing decompression, there can be a determination made on an intended destination for a packet (e.g., performed at each hop). For example, the Dest RS ID 302 could be the destination IP address of the relay from an IP header 310. As another example, the Dest RS ID 302 could be a compressed version of the destination IP address of the relay from the IP header 310, wherein the Relay Management Protocol manages how the compressed Dest RS ID 302 is assigned to each relay and how this information is propagated to each relay in the cluster if necessary. Thus, while at least a portion of a header can be compressed, a portion can be uncompressed such that there is not a need for decompression (e.g., any decompression, full decompression, etc.) at individual relays—thus saving processing time and quickening transfer of packets. However, decompression can occur if needed, such as at an endpoint (e.g., a relay before transferring to an access terminal).

There can be mapping of headers from an Internet Protocol (IP) to an IOS Compression Protocol (ICP). For instance, an IP header 310 field can include Type of Service and Traffic Class. An ICP common header field that maps to that IP header field can be Traffic Class, where the ICP uses the field to communicate Quality of Service information when there are more than two relay transfers. Thus, if there are more than two relay transfers, then there can be mapping of the Type of Service and Traffic Class into the ICP Traffic Class field—if there are less than two hops, the IP header field can be compressed since there is no need for the information. Moreover, a source IP address and Destination IP address can map to a Source RS ID 306 and destination RS ID 302 ICP common header field respectively. Additionally, a source and destination identification can be compressed into one field in one embodiment. In addition IP header fields such as Total Length, Time To Live, Protocol, Header Check Sum, Version, etc. can be compressed since there is no need for the information since the cluster is not routing using this IP header information. The configuration 300 can include a UDP Header 312 that can compress into a source port 314 as well as a IOS packet 316

Figure 4:
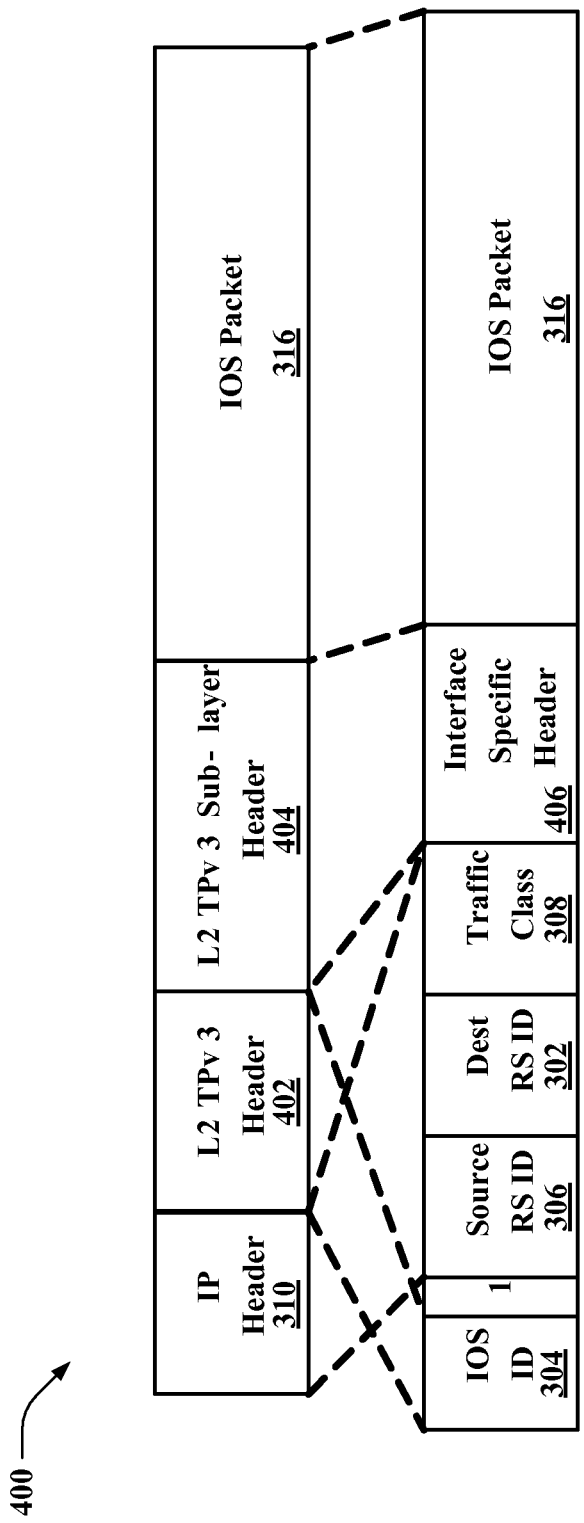
FIG. 4 is an illustration of a representative Layer 2 Tunneling Protocol Version 3/Internet Protocol compression scheme in accordance with at least one aspect disclosed herein.

Now referring to FIG. 4, an example packet configuration 400 is shown for having a sub layer header that can be evaluated by a base station to determine an intended access terminal. There can be a reservation label in a header to determine which stream or radio bearer a packet belongs for delivering the packet to the access terminal. There can be a number of streams (e.g., radio bearers in LTE) upon which information can travel. For example, voice can travel on one stream while signaling travels upon a different stream. In addition to a stream, there can be a Mobile Key that can be used to determine an intended destination (e.g., access terminal, user equipment, etc.). For example, the base station can receive packets for an access terminal in a layer 2 tunnel sent by an access gateway. The base station does not use the IP address of the packet to determine which access terminal is the intended destination, rather, the access gateway includes and Mobile Key in the layer 2 tunnel header 402 that is used by the base station to determine the access terminal. Based upon a Mobile Key and an IP address of the access gateway that sent the packet, a determination can be made on which access terminal is an intended destination and upon which stream to transfer the packet. Thus, there can be an IP header 310 that converts to a source RS ID, Dest RS ID, and/or traffic class. As another example, a TEID (tunnel endpoint identifier) can be used to indicate an intended relay, access terminal, and radio bearer for a packet, i.e., the TEID includes both the stream or reservation label and the access terminal as a single identifier. There can be two identifiers in the packet: an intended destination and which stream the packet should travel when being delivered to the intended destination or a single identifier that includes the intended destination and which stream the packet should travel when being delivered to the intended destination.

L2TPv3 Sub-layer Header 404 Fields can also be compressed into ICP header fields (e.g., interface specific header 406). For instance, the IP Address of the access gateway, the Mobile Key, as well as an identifier for the access terminal can be compressed into an AT ID field. In an alternate embodiment, the destination relay, access terminal and stream to use are contained in a single identifier. For example, the single identifier can be split in three separate fields wherein a portion of the identifier corresponds to the destination relay, a portion corresponds to the access terminal and a portion corresponds to the stream, or a base station tracks the identifier as a whole and packets are routed or delivered to the intended destination based on the whole identifier. In addition, there can be instances where mapping does not need to occur and a field can go unused—for instance, if there is one-to-one mapping, then some identifiers can be left out. The configuration 400 can also include an IOS ID 304 as well as an IOS packet 316.

Figure 5:
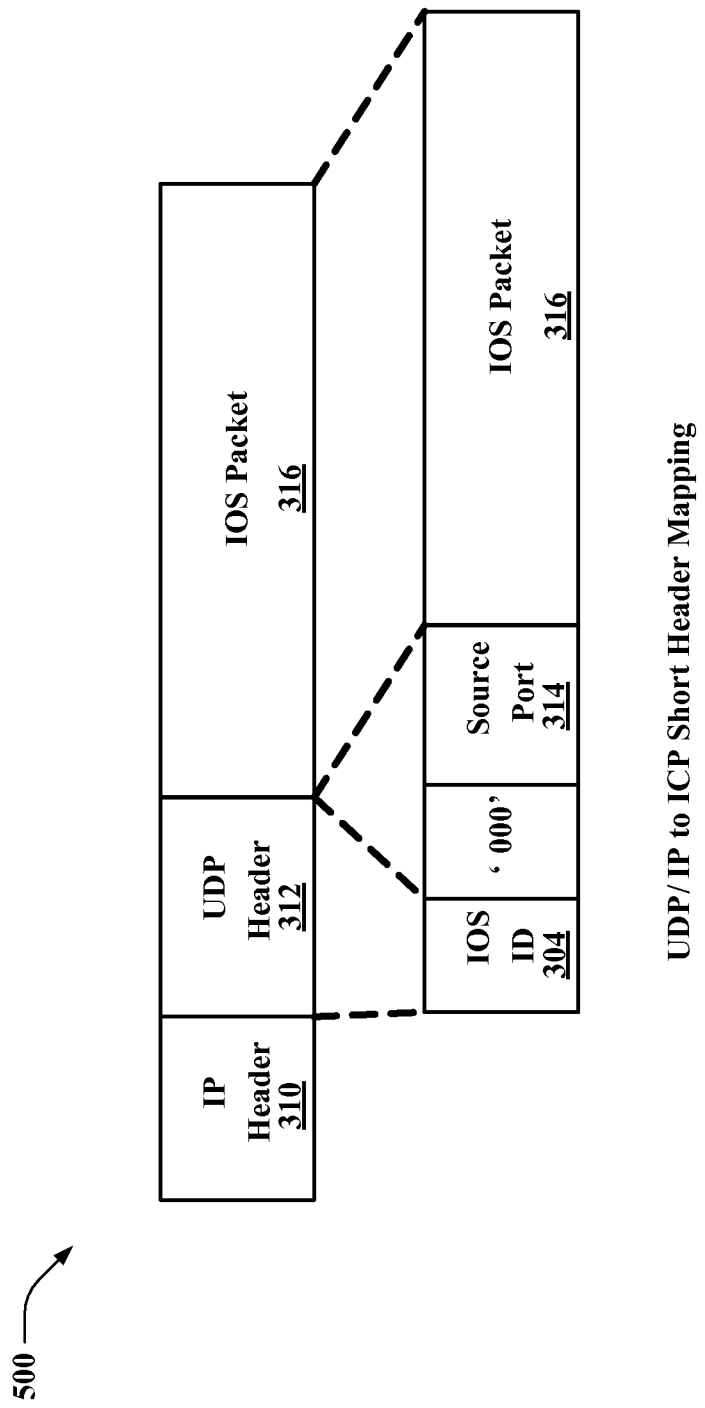
FIG. 5 is an illustration of a representative User Datagram Protocol/Internet Protocol compression scheme in accordance with at least one aspect disclosed herein.
Figure 6:
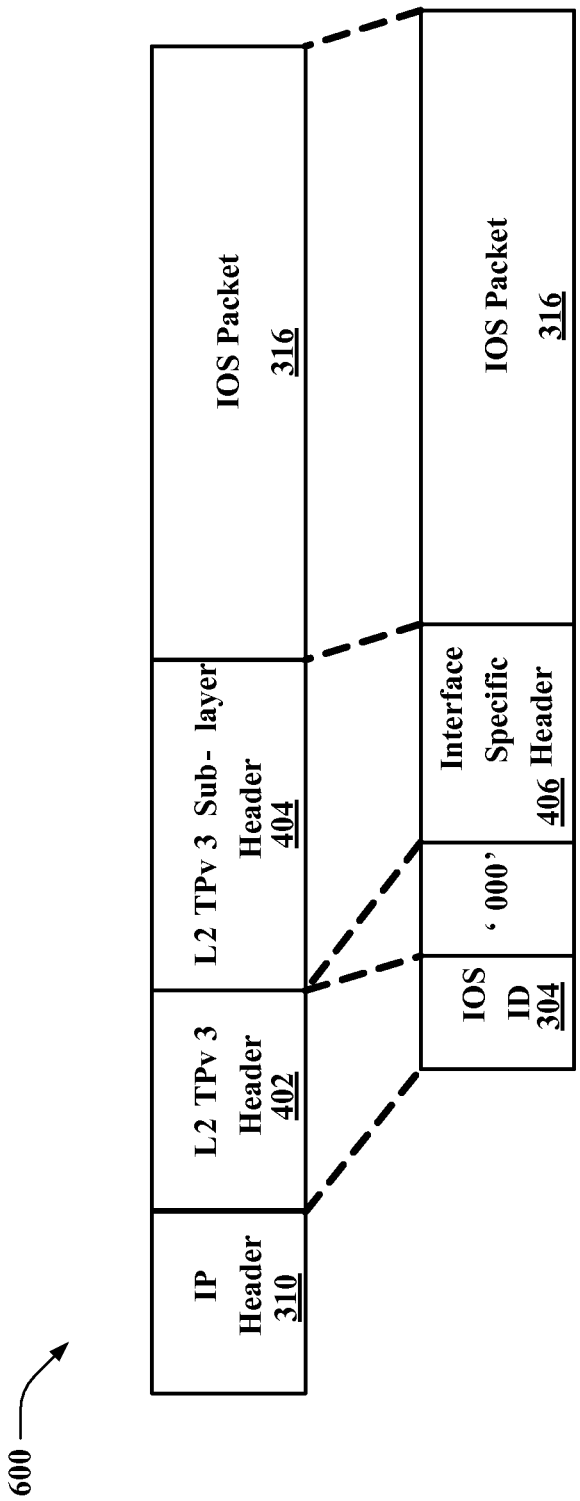
FIG. 6 is an illustration of a representative Layer 2 Tunneling Protocol Version 3/Internet Protocol compression scheme in accordance with at least one aspect disclosed herein.

With FIG. 5, an example packet configuration 500 is disclosed that can eliminate routing information with UDP/IP Short Header Mapping. The configuration 500 can include an IP header 310, UDP Header 312, IOS Packet 316, IOS ID 304, and/or a Source Port 314. Likewise, FIG. 6 shows an example packet configuration 600 for an L2TPv3/IP for Short Header Mapping. If there is only one hop that occurs, then there can be a header without routing information since a packet is sent directly to an access terminal from a first relay. For example, an IP header 310 can be compressed entirely. A check can be performed to determine if there is one relay transfer or more than one relay transfer. If there is more than one, then routing information can be included in the header; however, if there is one relay transfer, then a header can be used without routing information. The configuration 600 can also include a Level 2 Header 402, Level 2 Sub-layer Header 404, IOS ID 304, Interface Specific Header 406, and/or IOS Packet 316.

Figure 7:
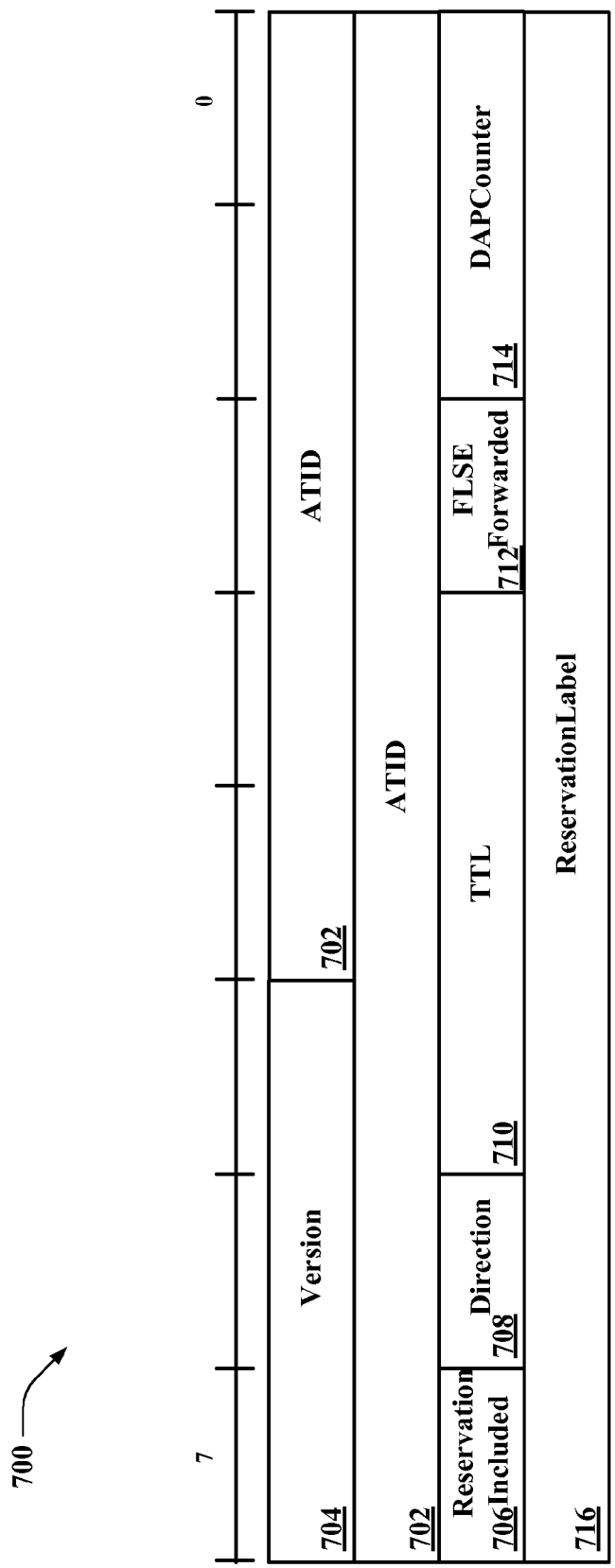
FIG. 7 is an illustration of a representative data header format in accordance with at least one aspect disclosed herein.

Referring now to FIG. 7, an example data header format 700 is disclosed for a compressed ICP header of an IPT header. The IPT header is associated with an IP Tunneling) Interface that carries signaling messages to notify and redirect tunneled traffic based on access terminal mobility. As an example the IPT interface encapsulates tunneled IP packets to be transmitted between base stations or relay stations for an access terminal. An ATID (Access Terminal Identifier) 702 can be a compressed AT identifier (ATI) used by IOS Compression Protocol. This can be equivalent to ATI, or the IP address of the access gateway and the Mobile Key. ATID can be a compressed AT identifier used by the IOS Compression Protocol. On the down link, ATID is used at the relay to determine the destination access terminal. Moreover, on the uplink, ATID can be used by a base station to determine a source access terminal.

It is possible that each access terminal has a unique ATID in a cluster and ATID is assigned by the base station when the access terminal can transmit to the base station and a relay in the cluster. An access terminal commonly does not know its own ATID and does not use the ATID. All relays in the cluster with a route to the access terminal can use the same ATID and all relays with a route in the cluster to a relay can also be assigned an ATID. The format 700 can also include metadata pertaining to version 704, reservation included 706, direction 708, TTL (Time to Live) 710, FLSE (Forward Link Servicing eBS) Forwarded 712, DAP (Directory Access Protocol) Counting module 714, or reservation label 716.

Now referring to FIG. 8, there is an example system 800 showing RS2 (relay 2) 802 communicating with a base station 804 (e.g., evolved base station (eBS)) through RS1 (relay 1) 806. RS2 can establish a communication link to RS1 and is assigned both an ATID and a RSID by the base station (eBS). RS2 can know its own RSID for processing packets but not its ATID and RS1 can know both the ATID and RSID and that both are for RS2. Relay stations in a cluster can have the RSID of RS2 to send or forward packets to RS2. IP packets for RS2 can be sent to or from RS1 using the ATID. Also, RS1 can add or remove the IOS Compression Protocol header and then forward the packet upstream or downstream respectively. IP packets of RS2 as a base station can be sent to or from RS2 using the RSID and RS1 can forward the packet as is upstream or downstream.

Figure 9:
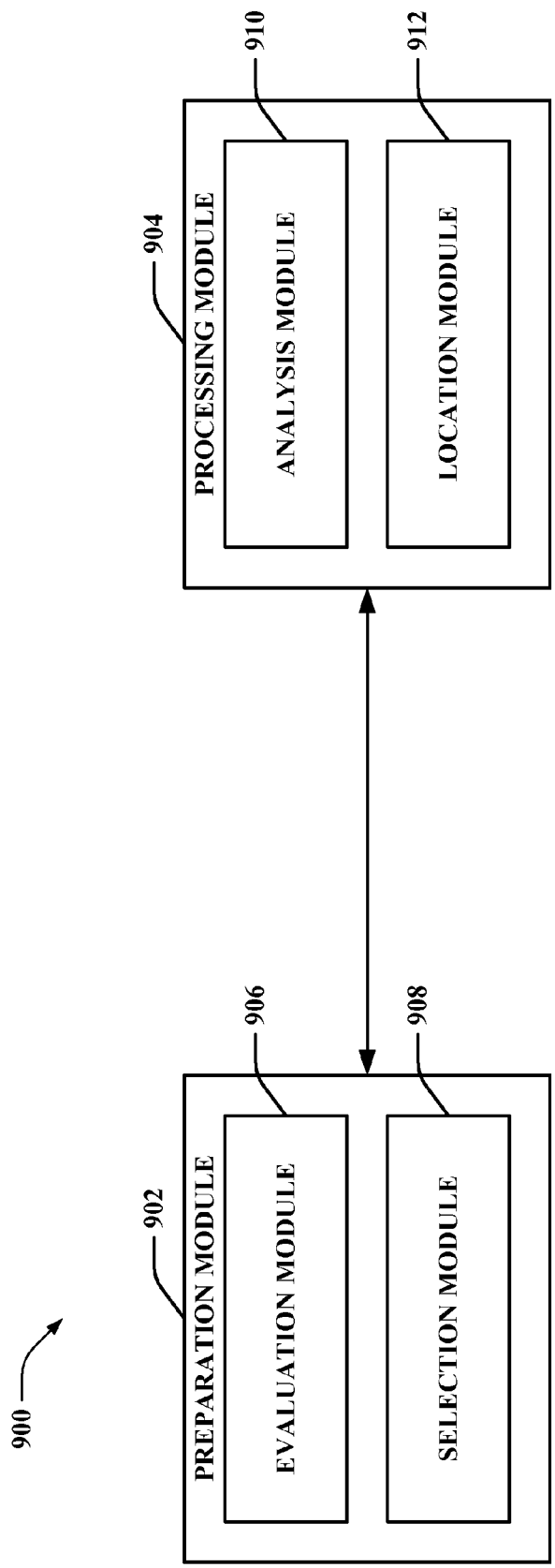
FIG. 9 is an illustration of a representative system for processing a packet in relation to a relay in accordance with at least one aspect disclosed herein.

Referring now to FIG. 9, an example system 900 is disclosed for processing relay operation in a wireless communication configuration. A preparation module 902 can organize a packet for communication (e.g., along the backhaul) including adding or compressing a header to the packet while a processing module 904 determines where to transfer a packet. An evaluation module 906 can identify if header compression (e.g., lossy compression, lossless compression, etc.) should occur, commonly, as a function of how many relay transfers are appropriate for the packet to reach an intended destination, or for example if one or more than one relay transfer is needed for the packet to reach an intended destination.

If the evaluation module 906 identifies that compression as inappropriate, then the packet can be sent in an uncompressed format. However, if compression should occur, then a selection module 908 can determine a manner for compression based upon a number of relay transfers for packet communication to the intended destination. The number of relay transfers can be an actual number (e.g., a positive integer) as well as a classification (e.g., no transfers, one transfer, or more than one transfer)—thus an actual number does not need to be determined. For example, if there is more than one relay transfer, then compression can occur in a manner that makes a destination identification accessible without performing decompression of at least a portion of the header. The preparation module 902 and/or processing module 904 can function upon a mobile device, access terminal, base station, relay, third-party device, etc.

For example, the preparation module 902 can function on a base station and the packet can be forwarded to a relay that includes the processing module 904. The processing module 904 can include an analysis module 910 that evaluates a packet header portion that comprises a destination identifier (e.g., a stream that should be used to communicate the packet, an access terminal or relay that is the destination of the packet, etc.). The destination identifier can comprise one or more separate fields, for example a separate stream identifier, an access terminal identifier and a relay identifier. Alternately, the destination identifier can comprise a single field with the stream identifier, access terminal identifier or relay identifier embedded in the identifier in some instances. For example, the single identifier can be split in three separate fields at a cluster wherein a portion of the identifier corresponds to the destination relay, a portion corresponds to the access terminal and a portion corresponds to the stream, or a base station or relay can track the destination identifier as a single field and packets are routed or delivered to the intended destination based on the whole identifier. A location module 912 can be employed to determine an intended relay for the packet based on a portion of the destination identifier. In addition to determining an intended relay, an intended destination, source of the packet, and other metadata can be determined.

Figure 10:
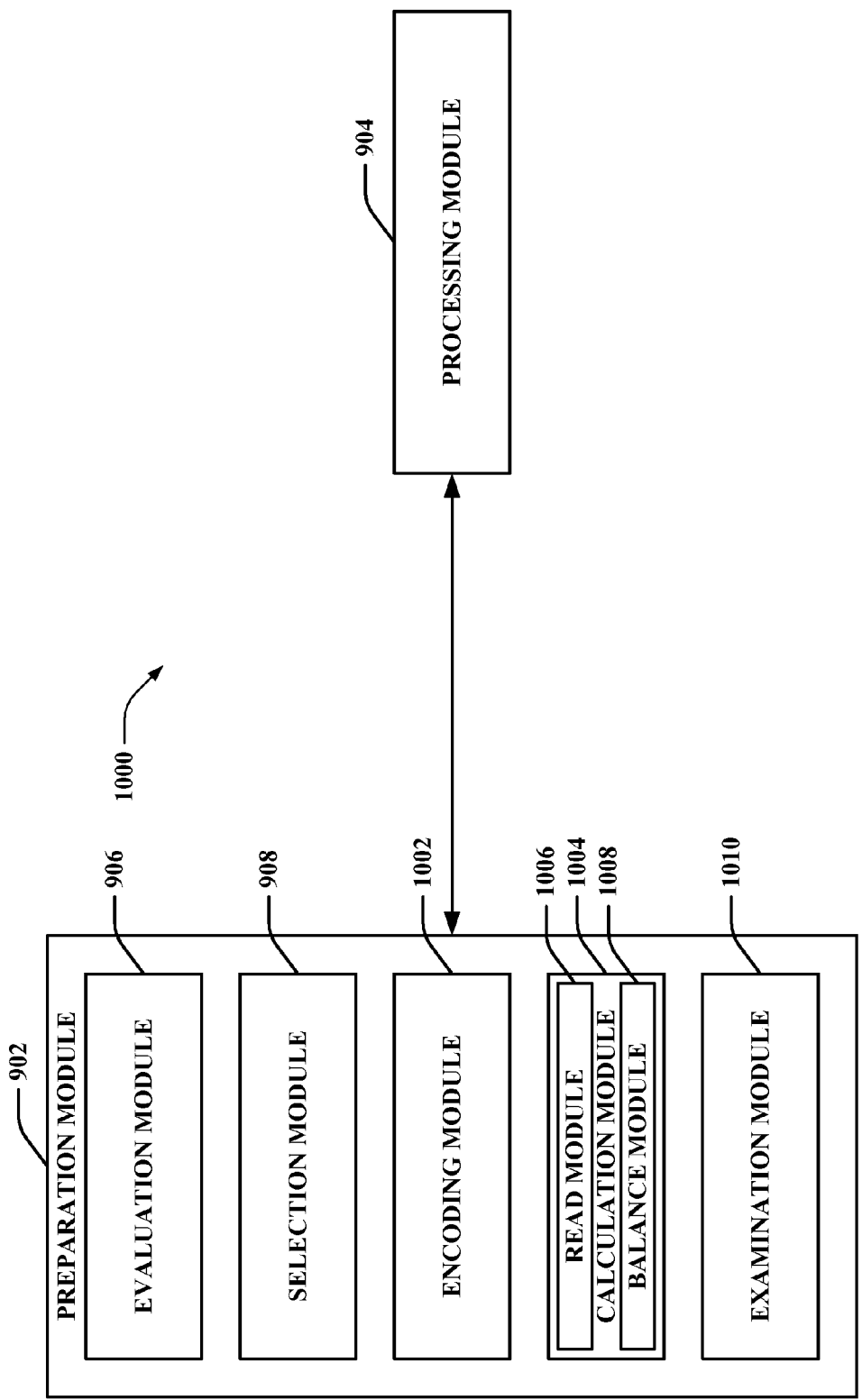
FIG. 10 is an illustration of a representative system for processing a packet in relation to a relay with a detailed preparation module in accordance with at least one aspect disclosed herein.

Now referring to FIG. 10, an example system 1000 is shown with a detailed preparation module 902 (e.g., with evaluation module 906 and selection module 908) for processing of a packet in relation to a relay. An encoding module 1002 can be used that compresses the header in the determined manner (e.g., with destination information compressed without a need to decompress to determine a location). According to one embodiment, a portion of the header that is compressed is an Internet Protocol (IP) header.

A calculation module 1004 can be used that determines a number of relay transfers the packet should experience to reach the intended destination. The determined manner can be based upon a determined number of relay transfers (e.g., one, more than one, etc.). If it is determined that there is more than one relay transfer, then encoding module 1002 can compress the header of the packet in a manner that makes a destination identification accessible without performing decompression of at least a portion of the header. Conversely, if it is determined there is one relay transfer to reach the intended destination, then the encoding module 1002 can compress the header of the packet in a manner such that there is not inclusion of routing or transfer information in the compressed header.

The calculation module 1004 can include a read module 1006 that determines the intended destination based on the header of the packet. A balance module 1008 can determine whether more than one relay transfer is required to reach the intended destination. For example, a communication network can be evaluated and a shortest path to an access terminal with minimal loss in packet quality can be tracked. As another example, it can only be known whether the access terminal is one hop or more than hop downstream and the next hop to reach the access terminal. Based upon the evaluation, a determination can be made on how to reach the access terminals and how many relay transfers occur to reach the access terminal. An examination module 1010 (e.g., part of the read module 1006, an independent unit, etc.) can determine a relay serving an access terminal that is the intended destination based on the packet header. The compressed packet can be evaluated and operated upon by the processing module 904 and transferred to a relay.

Figure 11:
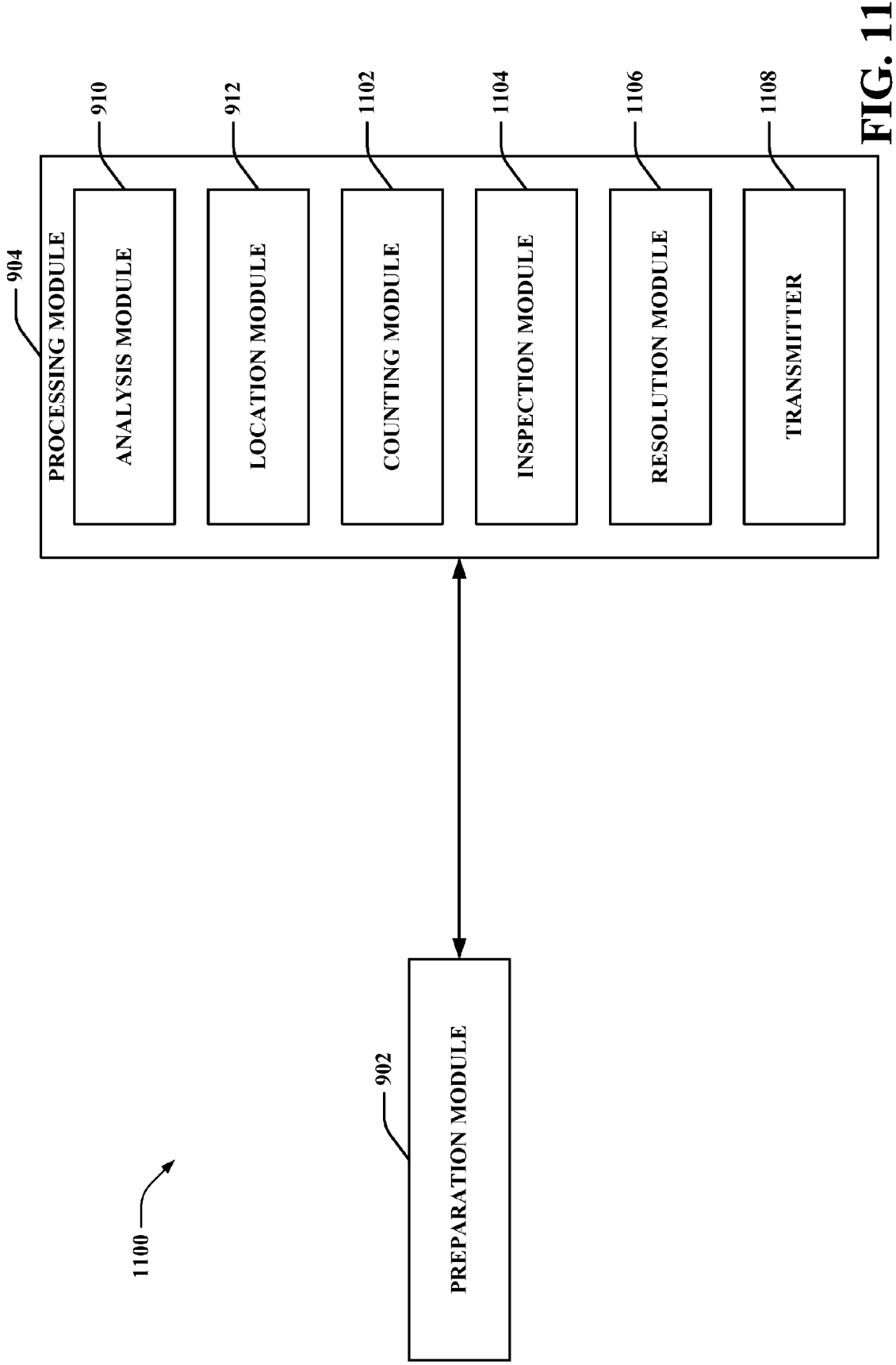
FIG. 11 is an illustration of a representative system for processing a packet in relation to a relay with a detailed processing module in accordance with at least one aspect disclosed herein.

Now referring to FIG. 11, an example system 1000 is disclosed for use of relays in communication of information, such as backhaul transfer. A preparation module 902 can prepare a header for use with a relay, including adding an appropriately compressed header of a packet. A processing module 904 (e.g., with analysis module 910 and locator 912) can perform routing operation upon a packet.

A destination identifier can be a valuable assent in transferring of the packet. According to one embodiment, the destination identifier is a tunnel endpoint identifier (TEID) and can also indicate a desired Quality of Service for the packet. For example, the TEID can map to a radio bearer that is used to transfer packets of a particular service class and QoS between an access terminal and a base station. A portion of a header for the packet can include a relay station identifier and/or an access terminal identifier (e.g., that is unique to a relay cluster) for an access terminal. According to one embodiment, the access terminal identifier and relay identifier are separate identifiers. According to another embodiment the relay station identifier and/or an access terminal identifier are part of the destination identifier, for example the TEID.

While the preparation module 902 and processing 904 can operate upon a base station or relay, it is possible for other configurations, such as the processing module 904 functioning upon a relay. A counting module 1102 can be used that determines a number of relay transfers the packet should experience to reach an intended destination (e.g., indicated by the destination identifier)—in one example, this can occur through analysis of the header (e.g., in compressed format, uncompressed format, etc.). An inspection module 1104 can be used that investigates a relationship of a relay cluster regarding relay-to-relay relationships and access terminal relationships. Based upon a result of the inspection module 1104, a resolution module 1106 can conclude a manner to reach the intended destination (e.g., identify a path, determine where next to send a packet, etc.). In one implementation, the concluded manner can include a number of stops along a relay cluster to reach the intended destination. A transmitter 1108 can be employed that transfers the packet to an intended destination.

It is to be appreciated that artificial intelligence techniques can be used to practice determinations and inferences disclosed herein. These techniques employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. These techniques can also include methods for capture of logical relationships such as theorem provers or more heuristic rule-based expert systems. These techniques can be represented as an externally pluggable module, in some cases designed by a disparate (third) party.

Figure 12:
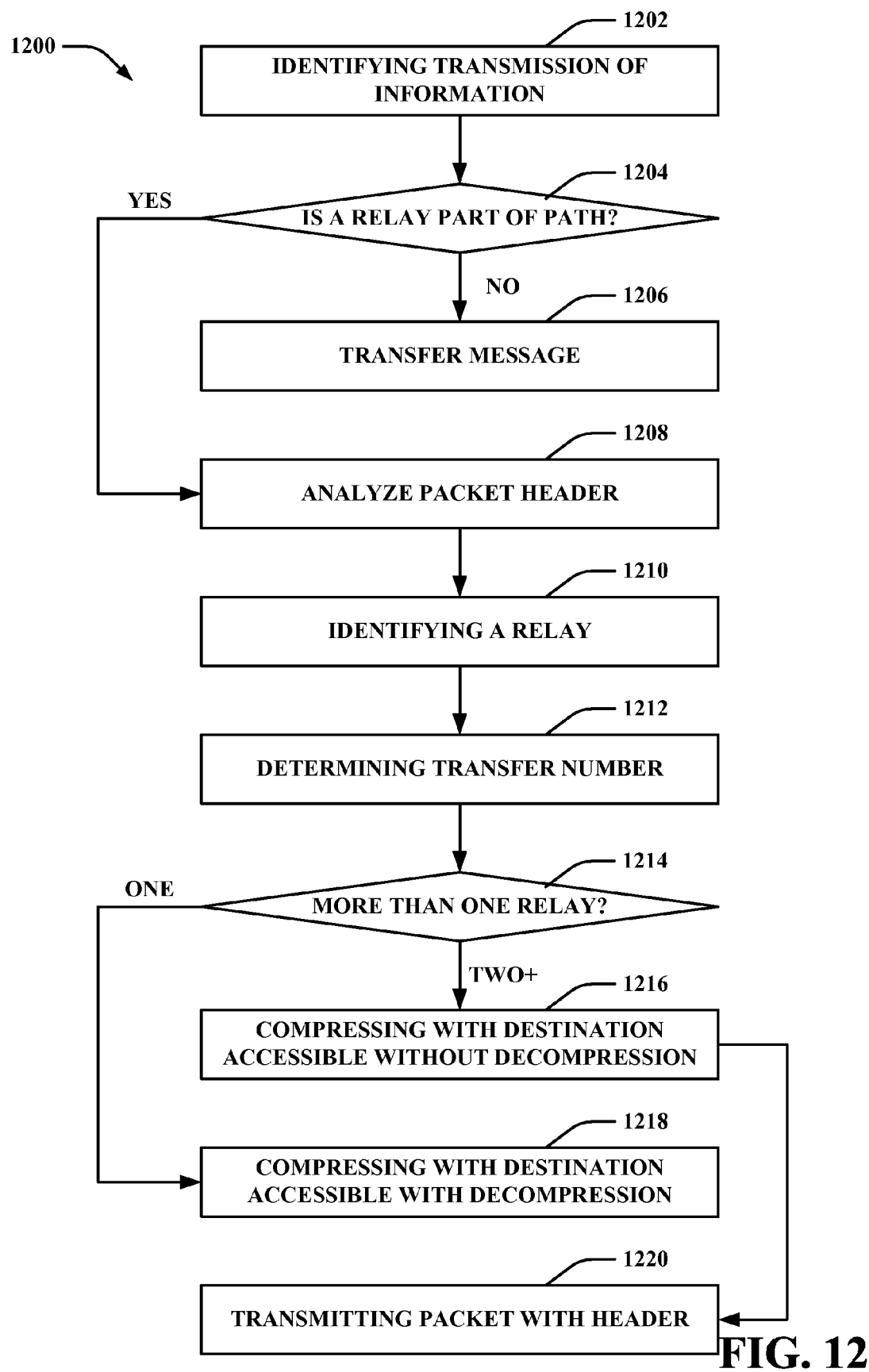
FIG. 12 is an illustration of a representative methodology for performing compression in accordance with at least one aspect disclosed herein.

Referring to FIG. 12, an example methodology 1200 is disclosed for transferring a message, commonly along at least a portion of a relay cluster. Identification can occur at 1202 that there should be transmission of a message, such as from a base station to an access terminal. The message can be evaluated along with a communication network and a determination can be made at 1204 on if the message travels along a relay to reach an intended destination. If there is no relay, then the message can be directly transferred to the intended destination at 1206 (e.g., without compression, with at least some compression, etc.).

However, if there is a relay along the path, then the packet header can be analyzed at 1208. Then relays on the path can be identified at 1210 and a determination can be made on how many relays are used on the path at 1212. At 1214, a check can occur on if there is one relay or more than one relay used, thus determining a classification number (e.g., a classification of relays, such as one, more than one, etc.). If there are more than two transfers, then header compression can occur at 1216 where destination information is accessible without decompression. Since there is more than one relay, an intermediary relay (a relay not transferring a message to the intended destination) does not need to fully decompress the header, but just detects the intended destination and forward to an appropriate relay. If 1214 determines that there is one relay, then at 1218 there can be header compression that also compresses destination information. For example the destination information can not be included. Regardless of the outcome of 1214, 1216 and 1218 can follow with transmission of the packet at 1220 (e.g., with a fully compressed header, a partially compressed header, uncompressed header, etc.).

The methodology 1200 can be practiced upon a base station as well as a relay. When functioning as a base station, the identification made at 1202 can be a request from a mobile device. The base station can obtain requested information, generate a message, and transfer the message to the mobile device. If the methodology 1200 functions upon the relay, the determination at 1204 can check if there are relays at further points along the path (e.g., the message experiences relays, but the relay functioning is a last relay before an access terminal).

Figure 13:
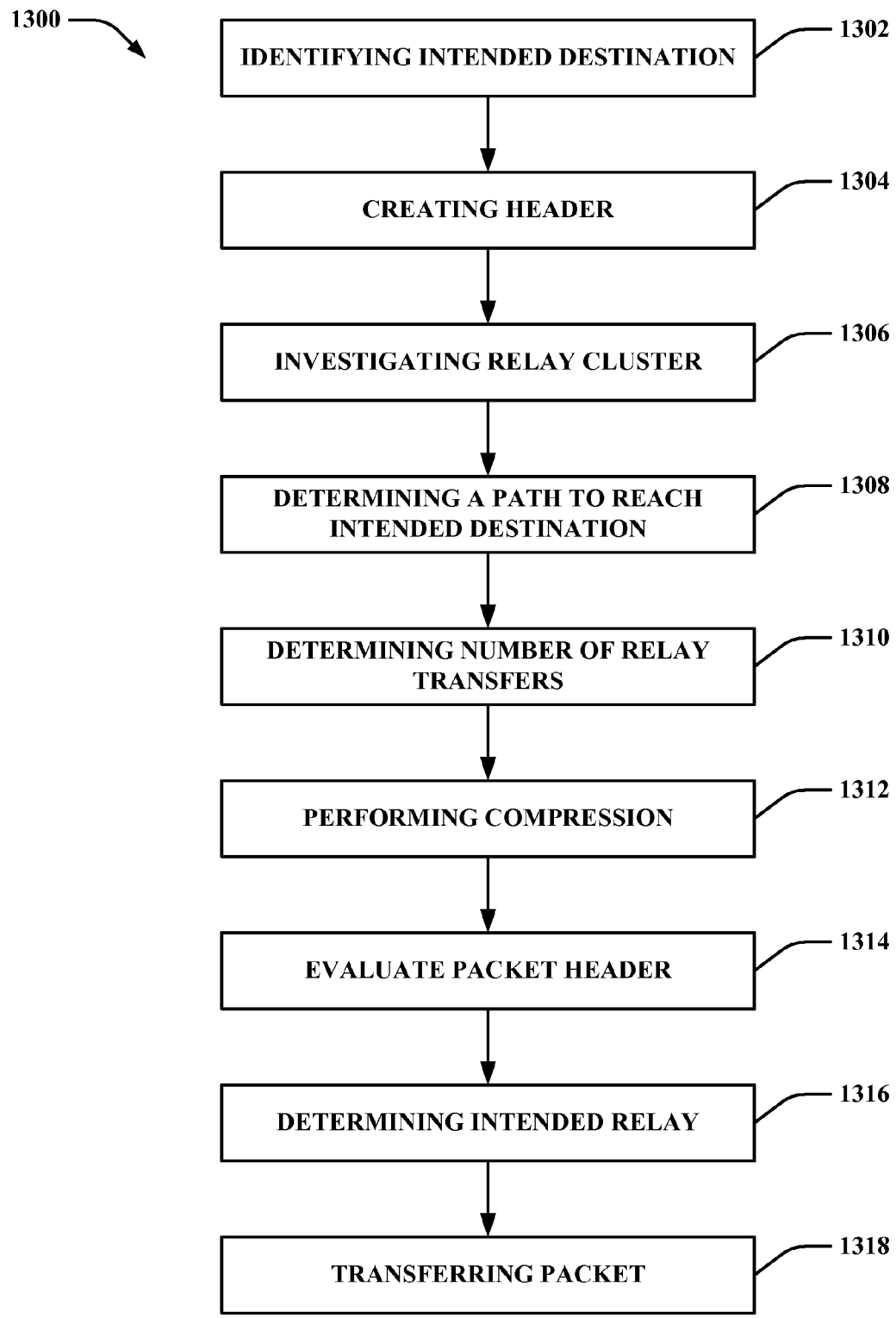
FIG. 13 is an illustration of a representative methodology for transferring a packet to a relay in accordance with at least one aspect disclosed herein.

Referring now to FIG. 13, an example methodology 1300 is disclosed for producing a header for a packet based upon a number of relay transfers for the packet to reach an intended destination. An intended destination can be identified at 1302 and a header for the packet can be created at 1304. The created header can be populated with information, including intended destination identification, source identification, traffic class, and the like. A relay cluster associated with a base station can be evaluated at 1306, as well as investigation of an entire communication network (e.g., an associated base station, access terminals, mobile devices capable of functioning as a relay, etc.). Based upon the investigation, a determination can be made at 1308 on how to reach the intended destination (e.g., which relays can be used to successfully reach the intended destination).

A number of relay transfers to perform can be determined at 1310 and based upon the determination, compression can be performed upon at least a portion of the header at 1312. Which portion is compressed can depend on a number of relays used in the transfer as discussed in relation to aspects disclosed herein. The header can be evaluated at 1314 and a determination can be made on which relay the packet should transfer to at 1316. The packet can transfer to the relay at 1318 and an acknowledgement can be collected.

Figure 14:
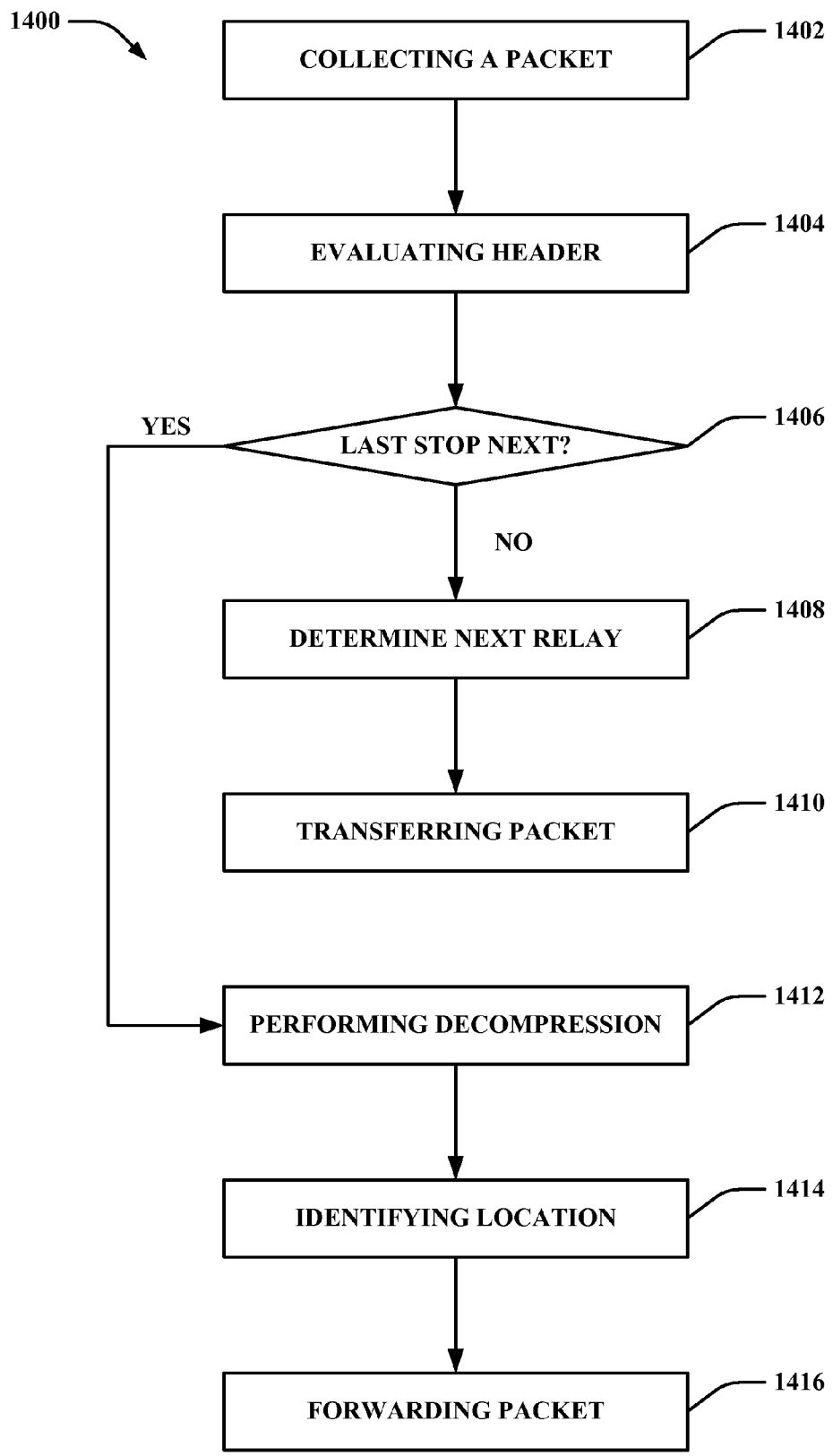
FIG. 14 is an illustration of a representative methodology for processing a packet at a relay in accordance with at least one aspect disclosed herein.

Now referring to FIG. 14, an example system 1400 is disclosed for processing a packet at a relay. A packet can be collected at 1402 and an evaluation of a header for the packet can be performed at 1404. The evaluation can include determining a source of the packet header, a stream or radio bearer upon which the header should travel an intended destination of the packet, and the like. At 1406, a check can take place determining if the relay is a next to last stop (e.g., a final relay before reaching an access terminal).

If the relay is not the next to last stop, then a determination can be made at 1408 on where to forward the packet (e.g., to a next relay). In one implementation, there can be analysis of a communication network to identify a next relay. For example, it can be known that two transfers should occur, but a second relay is not selected until the first relay is reached. The second relay can be selected based upon various factors (e.g., load balancing, interference, etc.). The determination can be made by decompressing the evaluated header as well as reading the header for intended destination information without decompressing an identifier of the header—the packet can be transferred to a next relay at 1410.

However, if the relay is the last stop before a final stop (e.g., an access terminal, user equipment, etc.), then there can be decompression of the header at 1412. An intended location of the packet can be identifier at 1414 and the packet can be forwarded to the intended destination at 1416. In one implementation, an acknowledgement can be received by the relay that the packet successfully arrives and the packet can be forwarded to a packet source.

Referring to FIGS. 12-14, methodologies are shown relating to use of a relay in information communication. For purposes of simplicity of explanation, the methodologies are shown and described as a series of acts, however, it should be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

It will be appreciated that, in accordance with one or more aspects described herein, inferences can be made regarding if a relay should be employed, if compression should occur, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a manner for compression of a packet header. By way of further illustration, an inference can be made related to processing a relay, selecting a destination identifier, etc. It will be appreciated that the foregoing examples are illustrative in nature and are not intended to limit the number of inferences that can be made or the manner in which such inferences are made in conjunction with the various embodiments and/or methods described herein.

Figure 15:
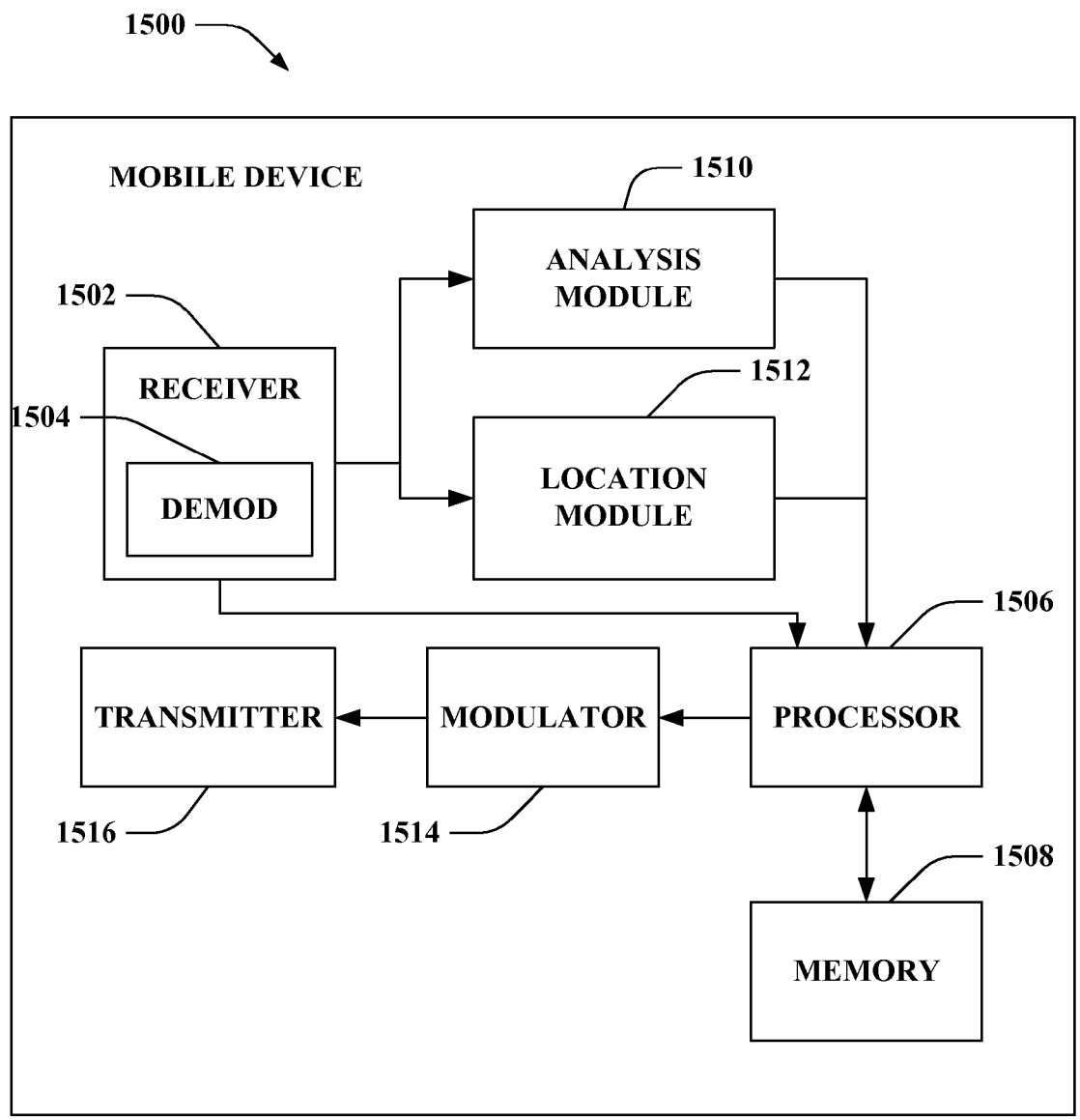
FIG. 15 is an illustration of an example mobile device that facilitates processing of a packet in relation to a relay in accordance with at least one aspect disclosed herein.

FIG. 15 is an illustration of a mobile device 1500 (e.g., that can function as a relay) that facilitates use of a relay in information communication—while aspects are shown functioning in a mobile device 1500, it is to be appreciated they can implement in other aspects. Mobile device 1500 comprises a receiver 1502 that receives a signal from, for instance, a receive antenna (not shown), and performs typical actions thereon (e.g., filters, amplifies, downconverts, etc.) the received signal and digitizes the conditioned signal to obtain samples. Receiver 1502 can be, for example, an MMSE receiver, and can comprise a demodulator 1504 that can demodulate received symbols and provide them to a processor 1506 for channel estimation. Processor 1506 can be a processor dedicated to analyzing information received by receiver 1502 and/or generating information for transmission by a transmitter 1516, a processor that controls one or more components of mobile device 1500, and/or a processor that both analyzes information received by receiver 1502, generates information for transmission by transmitter 1516, and controls one or more components of mobile device 1500.

Mobile device 1500 can additionally comprise memory 1508 that is operatively coupled to processor 1506 and that can store data to be transmitted, received data, information related to available channels, data associated with analyzed signal and/or interference strength, information related to an assigned channel, power, rate, or the like, and any other suitable information for estimating a channel and communicating via the channel. Memory 1508 can additionally store protocols and/or algorithms associated with estimating and/or utilizing a channel (e.g., performance based, capacity based, etc.).

It will be appreciated that the data store (e.g., memory 1508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1508 of the subject systems and methods is intended to comprise, without being limited to, these and any other suitable types of memory.

Processor 1502 is further operatively coupled an analysis module 1510 and/or a locator 1512. An analysis module 1510 can evaluate a packet header portion that comprises a destination identifier. Moreover, the locator 1512 can determine an intended relay for the packet based on at least a portion of the destination identifier. Mobile device 1500 still further comprises a modulator 1514 and a transmitter 1516 that transmits a signal (e.g., base CQI and differential CQI) to, for instance, a base station, another mobile device, etc. Although depicted as being separate from the processor 1506, it is to be appreciated that analysis module 1510 and/or locator 1512 can be part of processor 1506 or a number of processors (not shown).

Figure 16:
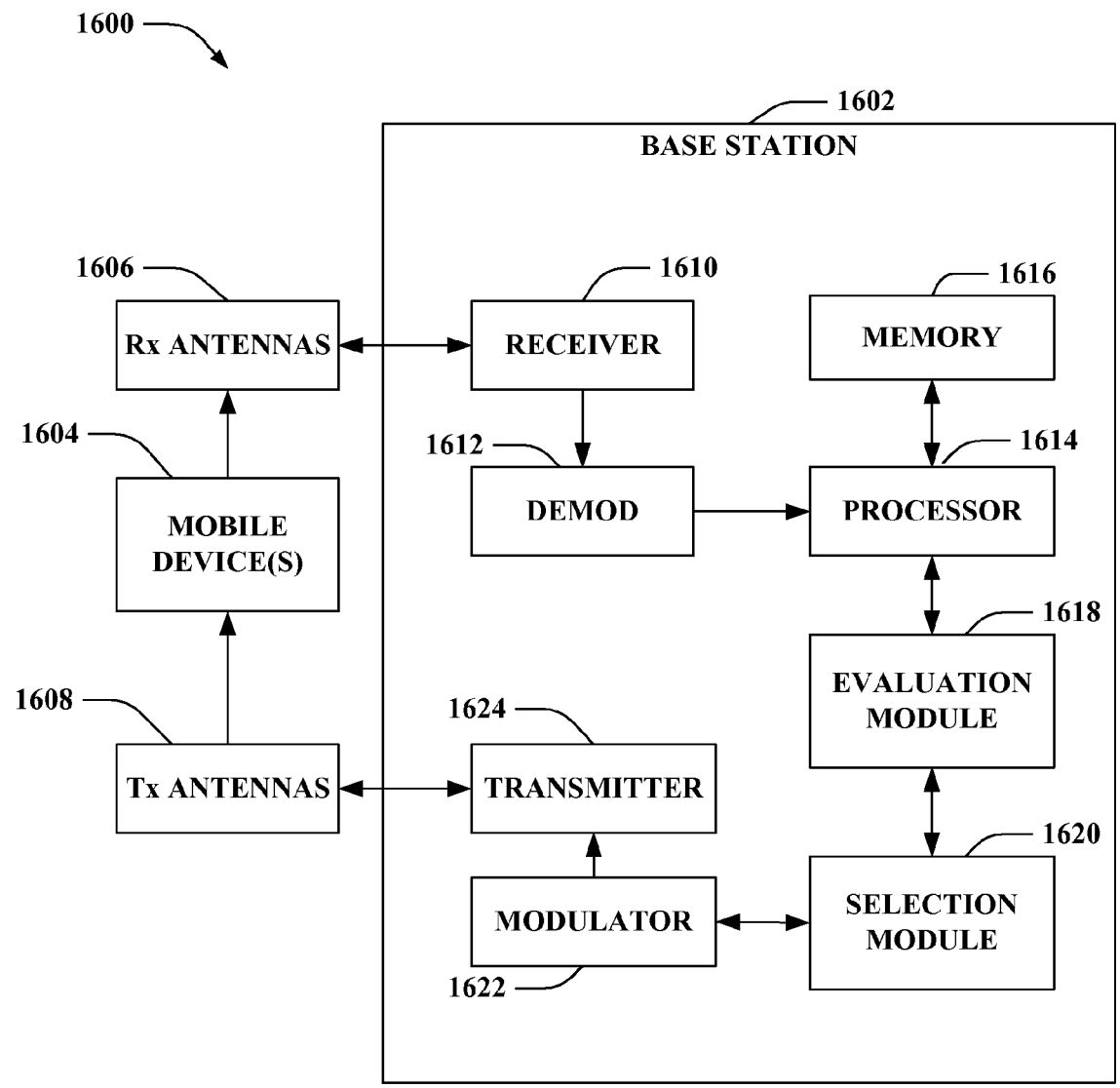
FIG. 16 is an illustration of an example system that facilitates preparation of a packet for transfer in accordance with at least one aspect disclosed herein.

FIG. 16 is an illustration of a system 1600 that facilitates compressing a packet header based upon an expected relay experience. System 1600 comprises a base station 1602 (e.g., that can function as a relay) with a receiver 1610 that receives signal(s) from one or more mobile devices 1604 through a plurality of receive antennas 1606, and a transmitter 1622 that transmits to the one or more mobile devices 1604 through a plurality of transmit antennas 1608. Receiver 1610 can receive information from receive antennas 1606 and is operatively associated with a demodulator 1612 that demodulates received information. Demodulated symbols are analyzed by a processor 1614 that can be similar to the processor described above with regard to FIG. 15, and which is coupled to a memory 1616 that stores information related to estimating a signal (e.g., pilot) strength and/or interference strength, data to be transmitted to or received from mobile device(s) 1604 (or a disparate base station (not shown)), and/or any other suitable information related to performing the various actions and functions set forth herein.

Processor 1614 is further coupled to an evaluation module 1618 that identifying that header compression should occur. The processor can also be operatively coupled to a selection module 1620 that determines a manner for compression based upon a number of relay transfers for packet communication to an intended destination. Information to be transmitted can be provided to a modulator 1622. Modulator 1622 can multiplex the information for transmission by a transmitter 1624 through antenna 1608 to mobile device(s) 1604. Although depicted as being separate from the processor 1614, it is to be appreciated that evaluation module 1618 and/or selection module 1620 can be part of processor 1614 or a number of processors (not shown).

Figure 17:
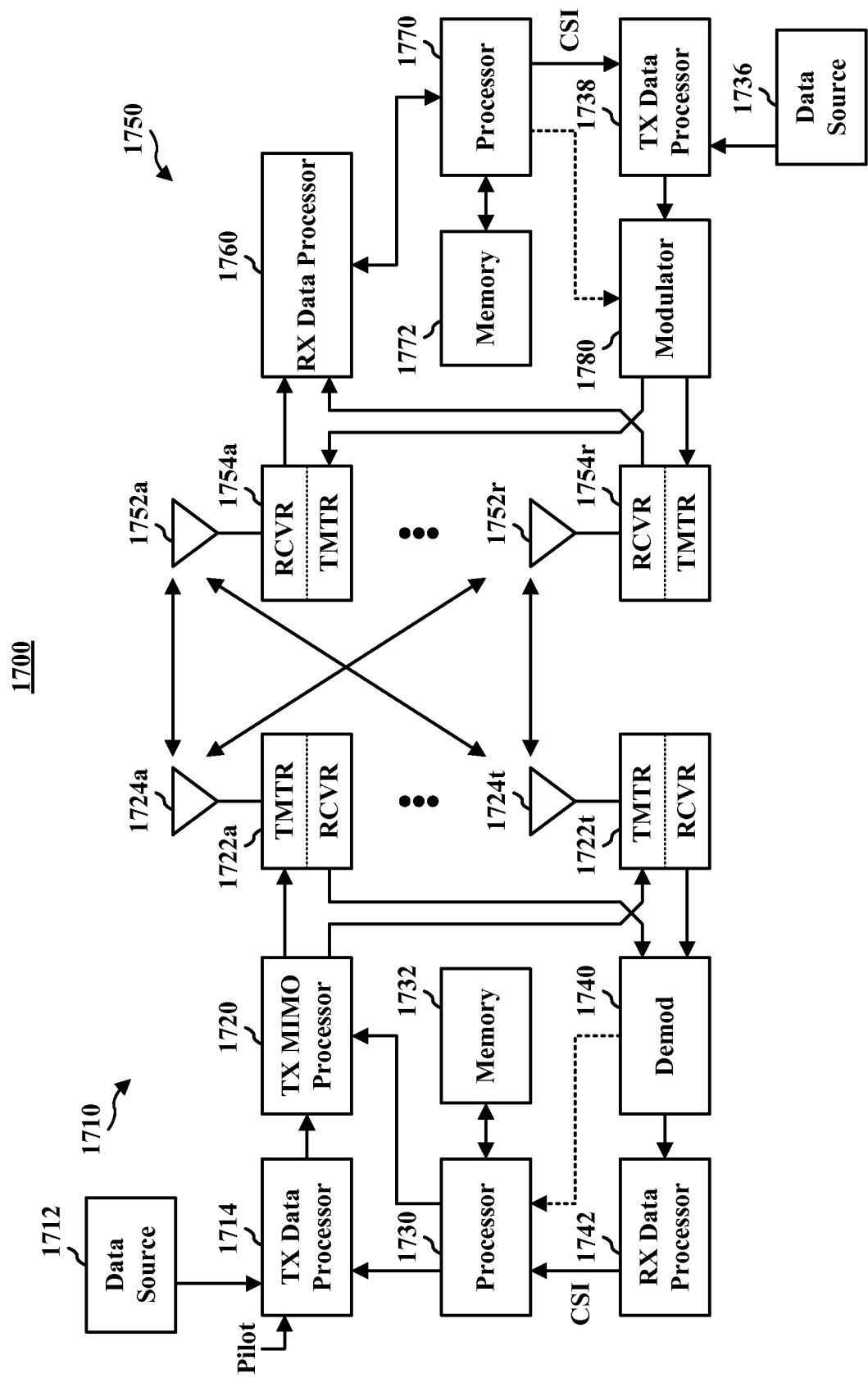
FIG. 17 is an illustration of an example wireless network environment that can be employed in conjunction with the various systems and methods described herein.

FIG. 17 shows an example wireless communication system 1700. The wireless communication system 1700 depicts one base station 1710 and one mobile device 1750 for sake of brevity. However, it is to be appreciated that system 1700 can include more than one base station and/or more than one mobile device, wherein additional base stations and/or mobile devices can be substantially similar or different from example base station 1710 and mobile device 1750 described below. In addition, it is to be appreciated that base station 1710 and/or mobile device 1750 can employ the systems (FIGS. 1-2, 8-11 and 15-16) and/or methods (FIGS. 12-14) described herein to facilitate wireless communication there between.

At base station 1710, traffic data for a number of data streams is provided from a data source 1712 to a transmit (TX) data processor 1714. According to an example, each data stream can be transmitted over a respective antenna. TX data processor 1714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1730.

The modulation symbols for the data streams can be provided to a TX MIMO processor 1720, which can further process the modulation symbols (e.g., for OFDM). TX MIMO processor 1720 then provides $N_T$ modulation symbol streams to $N_T$ transmitters (TMTR) 1722a through 1722t. In various embodiments, TX MIMO processor 1720 applies beamforming weights to the symbols of the data streams and to the antenna from which the symbol is being transmitted.

Each transmitter 1722 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1722a through 1722t are transmitted from $N_T$ antennas 1724a through 1724t, respectively.

At mobile device 1750, the transmitted modulated signals are received by $N_R$ antennas 1752a through 1752r and the received signal from each antenna 1752 is provided to a respective receiver (RCVR) 1754a through 1754r. Each receiver 1754 conditions (e.g., filters, amplifies, and downconverts) a respective signal, digitizes the conditioned signal to provide samples, and further processes the samples to provide a corresponding "received" symbol stream.

An RX data processor 1760 can receive and process the $N_R$ received symbol streams from $N_R$ receivers 1754 based on a particular receiver processing technique to provide $N_T$ "detected" symbol streams. RX data processor 1760 can demodulate, deinterleave, and decode each detected symbol stream to recover the traffic data for the data stream. The processing by RX data processor 1760 is complementary to that performed by TX MIMO processor 1720 and TX data processor 1714 at base station 1710.

A processor 1770 can periodically determine which preceding matrix to utilize as discussed above. Further, processor 1770 can formulate a reverse link message comprising a matrix index portion and a rank value portion.

The reverse link message can comprise various types of information regarding the communication link and/or the received data stream. The reverse link message can be processed by a TX data processor 1738, which also receives traffic data for a number of data streams from a data source 1736, modulated by a modulator 1780, conditioned by transmitters 1754a through 1754r, and transmitted back to base station 1710.

At base station 1710, the modulated signals from mobile device 1750 are received by antennas 1724, conditioned by receivers 1722, demodulated by a demodulator 1740, and processed by a RX data processor 1742 to extract the reverse link message transmitted by mobile device 1750. Further, processor 1730 can process the extracted message to determine which preceding matrix to use for determining the beamforming weights.

Processors 1730 and 1770 can direct (e.g., control, coordinate, manage, etc.) operation at base station 1710 and mobile device 1750, respectively. Respective processors 1730 and 1770 can be associated with memory 1732 and 1772 that store program codes and data. Processors 1730 and 1770 can also perform computations to derive frequency and impulse response estimates for the uplink and downlink, respectively. While not shown, the communication system 1700 can include a relay that facilitates communication between the base station 1710 and the mobile device 1750.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 18:
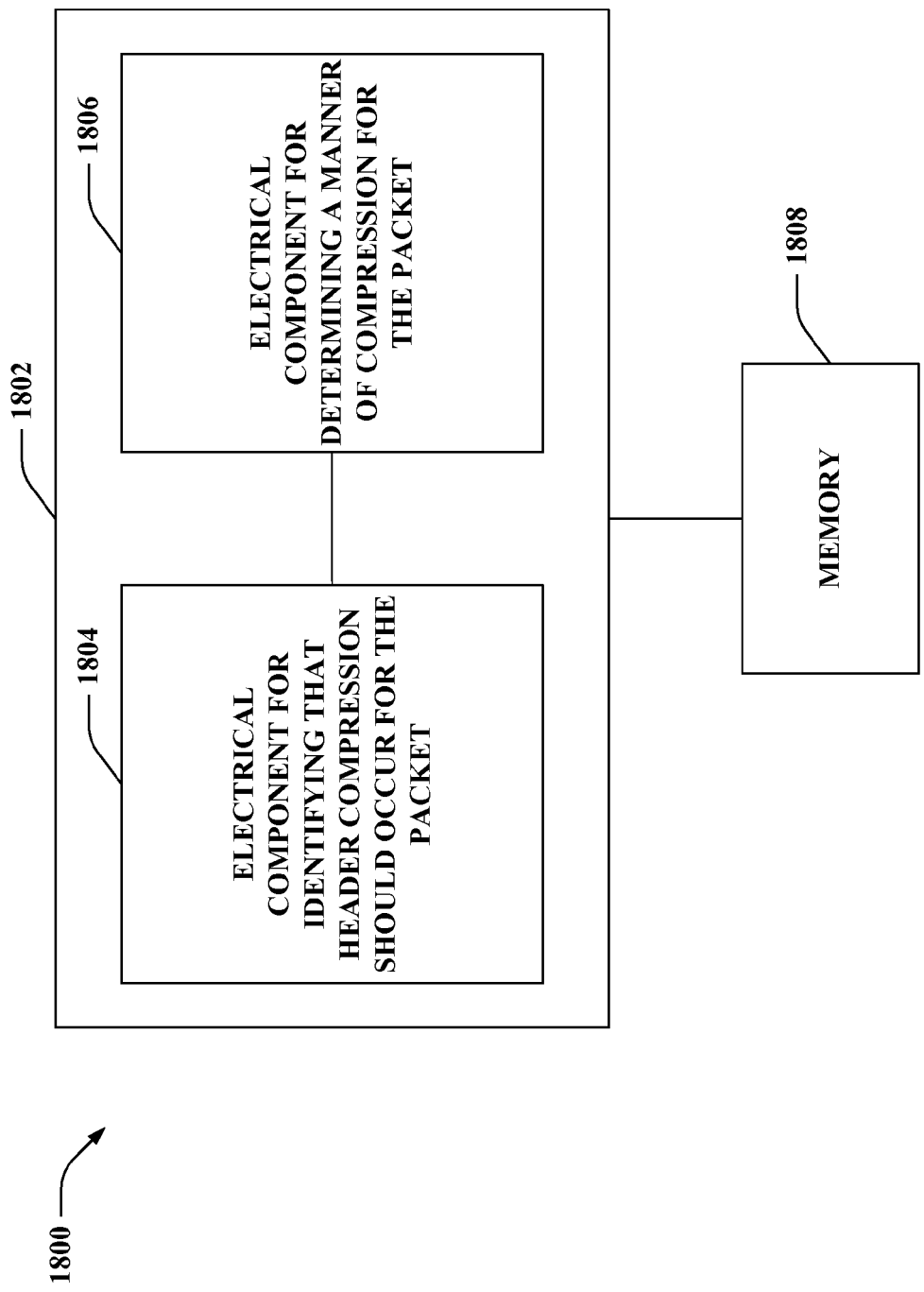
FIG. 18 is an illustration of an example system that prepares a packet for transmission in accordance with at least one aspect disclosed herein.

With reference to FIG. 18, illustrated is a system 1800 that effectuates packet header processing. For example, system 1800 can reside at least partially within a mobile device. It is to be appreciated that system 1800 is represented as including functional blocks, which can be functional blocks that represent functions implemented by a processor, software, or combination thereof (e.g., firmware). System 1800 includes a logical grouping 1802 of electrical components that can act in conjunction. For instance, logical grouping 1802 can include electrical component for identifying that header compression should occur 1804. Moreover, the logical grouping 1802 can include electrical component for determining a manner of compression for the packet (e.g., the manner is based upon a number of relay transfers for the packet to reach an intended destination) 1806. Additionally, system 1800 can include a memory 1808 that retains instructions for executing functions associated with electrical components 1804 and 1806. While shown as being external to memory 1808, it is to be understood that one or more of electrical components 1804 and 1806 can exist within memory 1808.

Figure 19:
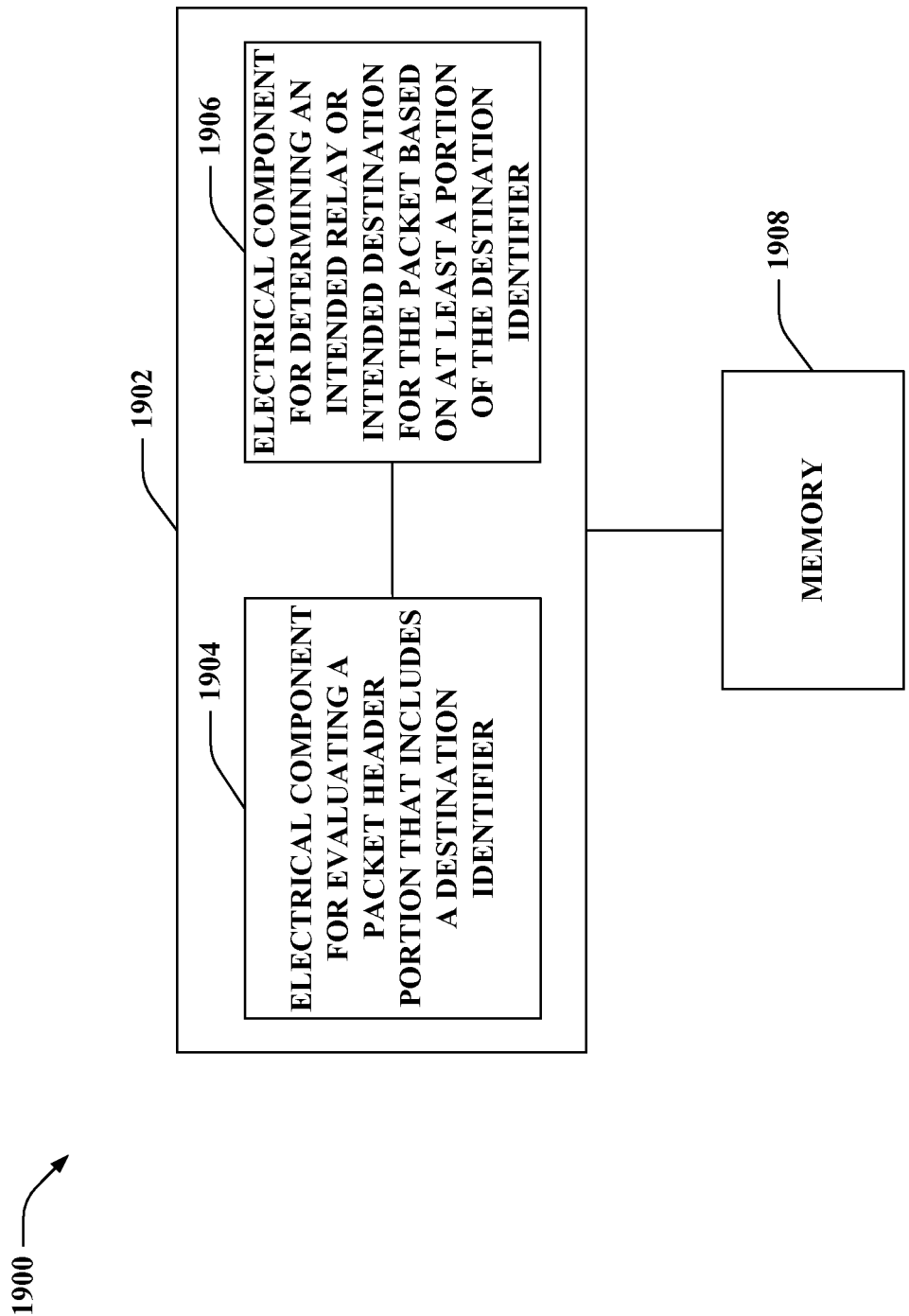
FIG. 19 is an illustration of an example system that processes transferred information in accordance with at least one aspect disclosed herein.

Turning to FIG. 19, illustrated is a system 1900 that processes a packet relating to relays. System 1900 can reside within a base station, for instance. As depicted, system 1900 includes functional blocks that can represent functions implemented by a processor, software, or combination thereof (e.g., firmware). System 1900 includes a logical grouping 1902 of electrical components that facilitate controlling forward link transmission. Logical grouping 1902 can include electrical component for evaluating a packet header portion that comprises a destination identifier 1904. Moreover, logical grouping 1902 can include electrical component for determining an intended relay for the packet based on at least a portion of the destination identifier 1906. Additionally, system 1900 can include a memory 1908 that retains instructions for executing functions associated with electrical components 1904 and 1906. While shown as being external to memory 1908, it is to be understood that electrical components 1904 and 1906 can exist within memory 1908.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method for managing compression of a header of a packet executable upon a wireless communication device, comprising:
   identifying whether header compression should occur for the packet based upon a number of relay transfers for the packet to reach an intended destination; and
   determining a manner of compression for the packet, wherein the manner is based upon the identification whether header compression should occur and the number of relay transfers for the packet to reach the intended destination, wherein the determined manner is such that destination identification is accessible without performing decompression of at least a portion of the header if it is determined that there is more than one relay transfer for the packet to reach the intended destination.

2. The method of claim 1, further comprising compressing the header, wherein compression occurs in accordance with the determined manner.

3. The method of claim 2, further comprising determining the number of relay transfers for the packet to reach the intended destination.

4. The method of claim 3, wherein the determined manner is such that routing or transfer information is not included in the compressed header if it is determined there is one relay transfer for the packet to reach the intended destination.

5. The method of claim 3, wherein determining a number of relay transfers for a packet further comprises:
   determining the intended destination based upon the header of the packet; and
   determining whether more than one relay transfer is required to reach the intended destination.

6. The method of claim 5, wherein determining the intended destination based upon the header of the packet further comprises determining a relay serving an access terminal that is the intended destination based upon the header of the packet.

7. The method of claim 2, a portion of the header that is compressed being an Internet Protocol header.

8. An apparatus, comprising:
   an evaluation module that identifies whether header compression should occur for a packet based upon a number of relay transfers for the packet to reach an intended destination; and
   a selection module that determines a manner of compression for the packet, wherein the manner is based upon the identification whether header compression should occur and the number of relay transfers for the packet to reach the intended destination, wherein the determined manner is such that destination identification is accessible without performing decompression of at least a portion of the header if it is determined that there is more than one relay transfer for the packet to reach the intended destination.

9. The apparatus of claim 8, further comprising an encoding module that compresses the header, wherein compression occurs in accordance with the determined manner.

10. The apparatus of claim 9, further comprising a calculation module that determines the number of relay transfers for the packet to reach the intended destination.

11. The apparatus of claim 10, wherein the determined manner is such that routing or transfer information is not included in the compressed header if it is determined there is one relay transfer for the packet to reach the intended destination.

12. The apparatus of claim 10, wherein the calculation module further comprises:
   a read module that determines the intended destination based upon the header of the packet; and
   a balance module that determines whether more than one relay transfer is required to reach the intended destination.

13. The apparatus of claim 12, wherein the read module further comprises an examination module that determines a relay serving an access terminal that is the intended destination based upon the header of the packet.

14. The apparatus of claim 9, a portion of the header that is compressed being an Internet Protocol header.

15. At least one processor configured to manage compression of a header of a packet, comprising:

a first module for identifying whether header compression should occur for the packet based upon a number of relay transfers for the packet to reach an intended destination; and
a second module for determining a manner of compression for the packet, wherein the manner is based upon the identification whether header compression should occur and the number of relay transfers for the packet to reach the intended destination, wherein the determined manner is such that destination identification is accessible without performing decompression of at least a portion of the header if it is determined that there is more than one relay transfer for the packet to reach the intended destination.

16. A computer program product, comprising:
a non-transitory computer-readable medium comprising:
   a first set of codes for causing a computer to identify whether header compression should occur for a packet based upon a number of relay transfers for the packet to reach an intended destination; and
   a second set of codes for causing the computer to determine a manner of compression for the packet, wherein the manner is based upon the identification whether header compression should occur and the number of relay transfers for the packet to reach the intended destination, wherein the determined manner is such that destination identification is accessible without performing decompression of at least a portion of the header if it is determined that there is more than one relay transfer for the packet to reach the intended destination.

17. An apparatus, comprising:
means for identifying whether header compression should occur for a packet based upon a number of relay transfers for the packet to reach an intended destination; and
means for determining a manner of compression for the packet, wherein the manner is based upon the identification whether header compression should occur and the number of relay transfers for the packet to reach the intended destination, wherein the determined manner is such that destination identification is accessible without performing decompression of at least a portion of the header if it is determined that there is more than one relay transfer for the packet to reach the intended destination.

18. A method for processing a packet executable upon a wireless communication device, comprising:
   evaluating a packet header portion that includes a destination identifier, wherein the packet header portion is compressed based on a number of relay transfers between a source and an intended destination for the packet; and
   determining an intended relay or the intended destination for the packet based on at least a portion of the destination identifier, wherein the destination identifier is accessible without performing decompression of at least a portion of the header if there is more than one relay transfer for the packet to reach the intended destination.

19. The method of claim 18, wherein the destination identifier indicates a desired Quality of Service for the packet.

20. The method of claim 19, further comprising transferring the packet to the intended destination, wherein said transfer to the intended destination occurs on a stream indicated by the desired Quality of Service for the packet.

21. The method of claim 18, the destination identifier being a tunnel endpoint identifier.

22. The method of claim 18, wherein the destination identifier includes a relay station identifier.

23. The method of claim 18, wherein the destination identifier includes an access terminal identifier for an access terminal.

24. The method of claim 23, the access terminal identifier being unique to the access terminal in a relay cluster.

25. The method of claim 23, further comprising determining a number of relay transfers the packet should experience to reach the intended destination, wherein the access terminal identifier indicates the intended destination.

26. The method of claim 23, wherein the destination identifier includes an access terminal identifier and a relay identifier with the access terminal identifier and the relay identifier being separate identifiers.

27. An apparatus, comprising:
an analysis module to evaluate a packet header portion that comprises a destination identifier, wherein the packet header portion is compressed based on a number of relay transfers between a source and an intended destination for the packet; and
a location module to determine an intended relay or the intended destination for the packet based on at least a portion of the destination identifier, wherein the destination identifier is accessible without performing decompression of at least a portion of the header if there is more than one relay transfer for the packet to reach the intended destination.

28. The apparatus of claim 27, wherein the destination identifier indicates a desired Quality of Service for the packet.

29. The apparatus of claim 28, further comprising a transmitter that transfers the packet to the intended destination, the transfer to the intended destination occurring on a stream indicated by the desired Quality of Service for the packet.

30. The apparatus of claim 27, the destination identifier being a tunnel endpoint identifier.

31. The apparatus of claim 27, wherein the destination identifier includes a relay station identifier.

32. The apparatus of claim 27, wherein the destination identifier includes an access terminal identifier for an access terminal.

33. The apparatus of claim 32, the access terminal identifier being unique to the access terminal in a relay cluster.

34. The apparatus of claim 32, further comprising a counting module that determines a number of relay transfers the packet should experience to reach the intended destination, wherein the access terminal identifier indicates the intended destination.

35. The apparatus of claim 32, wherein the destination identifier includes the access terminal identifier and a relay identifier with the access terminal identifier and the relay identifier being separate identifiers.

36. At least one processor configured to process a packet, comprising:
a first module for evaluating a packet header portion that comprises a destination identifier, wherein the packet header portion is compressed based on a number of relay transfers between a source and an intended destination for the packet; and
a second module for determining an intended relay or the intended destination for the packet based on at least a portion of the destination identifier, wherein the destination identifier is accessible without performing decompression of at least a portion of the header if there is more than one relay transfer for the packet to reach the intended destination.

37. A computer program product, comprising:
a non-transitory computer-readable medium comprising:
a first set of codes for causing a computer to evaluate a packet header portion that includes a destination identifier, wherein the packet header portion is compressed based on a number of relay transfers between a source and an intended destination for the packet; and
a second set of codes for causing the computer to determine an intended relay or the intended destination for the packet based on at least a portion of the destination identifier, wherein the destination identifier is accessible without performing decompression of at least a portion of the header if there is more than one relay transfer for the packet to reach the intended destination.

38. An apparatus, comprising:
means for evaluating a packet header portion that includes a destination identifier, wherein the packet header portion is compressed based on a number of relay transfers between a source and an intended destination for the packet; and
means for determining an intended relay or the intended destination for the packet based on at least a portion of the destination identifier, wherein the destination identifier is accessible without performing decompression of at least a portion of the header if there is more than one relay transfer for the packet to reach the intended destination.

39. The apparatus of claim 17, further comprising means for compressing a header, wherein compression occurs in accordance with the determined manner.

40. The apparatus of claim 39, further comprising means for determining the number of relay transfers for the packet to reach the intended destination.

41. The apparatus of claim 40, wherein the determined manner is such that routing or transfer information is not included in the compressed header if it is determined there is one relay transfer for the packet to reach the intended destination.

42. The apparatus of claim 40, wherein the means for determining a number of relay transfers for a packet further comprises:
means for determining the intended destination based upon the header of the packet; and
means for determining whether more than one relay transfer is required to reach the intended destination.

43. The apparatus of claim 42, wherein the means for determining the intended destination based upon the header of the packet further comprises means for determining a relay serving an access terminal that is the intended destination based upon the header of the packet.

44. The apparatus of claim 39, a portion of the header that is compressed being an Internet Protocol header.

45. The apparatus of claim 38, wherein the destination identifier indicates a desired Quality of Service for the packet.

46. The apparatus of claim 45, further comprising means for transferring the packet to the intended destination, wherein said transfer to the intended destination occurs on a stream indicated by the desired Quality of Service for the packet.

47. The apparatus of claim 38, the destination identifier being a tunnel endpoint identifier.

48. The apparatus of claim 38, wherein the destination identifier includes a relay station identifier.

49. The apparatus of claim 38, wherein the destination identifier includes an access terminal identifier for an access terminal.

50. The apparatus of claim 49, the access terminal identifier being unique to the access terminal in a relay cluster.

51. The apparatus of claim 49, further comprising means for determining a number of relay transfers the packet should experience to reach the intended destination, wherein the access terminal identifier indicates the intended destination.

52. The apparatus of claim 49, wherein the destination identifier includes an access terminal identifier and a relay identifier with the access terminal identifier and the relay identifier being separate identifiers.

* * * * *